(12) United States Patent
Tabata et al.

(10) Patent No.: US 7,305,536 B2
(45) Date of Patent: Dec. 4, 2007

(54) STORAGE SYSTEM CAPABLE OF RELOCATING DATA

(75) Inventors: Shunya Tabata, Tokyo (JP); Naotsugu Toume, Yokohama (JP); Fuming Liu, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 255 days.

(21) Appl. No.: 11/264,039

(22) Filed: Nov. 2, 2005

(65) Prior Publication Data

US 2007/0050588 A1 Mar. 1, 2007

(30) Foreign Application Priority Data

Aug. 25, 2005 (JP) ............................. 2005-243974

(51) Int. Cl.
G06F 12/00 (2006.01)
G06F 15/16 (2006.01)
G06F 15/167 (2006.01)

(52) U.S. Cl. ...................... 711/165; 711/114; 711/170; 709/213; 709/214; 709/216; 709/217

(58) Field of Classification Search ................ 711/114, 711/154, 165, 170, 171, 173; 709/213, 214, 709/215, 216, 217, 218, 219
See application file for complete search history.

(56) References Cited

U.S. PATENT DOCUMENTS 5,875,481 A * 2/1999 Ashton et al. ............... 711/165

2006/0069865 A1 * 3/2006 Kawamura et al. ......... 711/114
2007/0073988 A1 * 3/2007 Shibayama et al. ......... 711/165

FOREIGN PATENT DOCUMENTS

| JP | 2003-140836 | 5/2003 |
|---|---|---|
| JP | 2005-050007 | 2/2005 |

* cited by examiner

*Primary Examiner*—Jack Lane
(74) *Attorney, Agent, or Firm*—Antonelli, Terry, Stout & Kraus, LLP.

(57) ABSTRACT

The data migration method of this invention is for a computer system. The data migration method is characterized in that the storage system measures, for each logical volume, a used I/O amount and a storage capacity of the logical volume, the management computer manages the logical volumes in groups by storing the association relation between the logical volumes and the groups, the management computer obtains, from the storage system, the used I/O amount of the logical volume and storage capacity, which are measured by the storage system, the management computer identifies a logical volume to which data is to be moved based on the ratio of the obtained I/O amount of the logical volume to the obtained storage capacity of the logical volume, and the management computer instructs the storage system to move data from the data's original logical volume to the logical volume designated as the migration destination.

18 Claims, 22 Drawing Sheets

| VOLUME ID | ASSIGNED ARRAY GROUP NAME | USED PERFORMANCE AMOUNT | CAPACITY | USED PERFORMANCE DENSITY | ACTIVE / INACTIVE STATE |
|---|---|---|---|---|---|
| 0:00 | ARRAY GROUP ONE | 20MB/s | 10GB | 2.00 | IN USE |
| 0:01 | ARRAY GROUP ONE | 0MB/s | 10GB | 0.00 | NOT IN USE |
| 1:00 | ARRAY GROUP TWO | 5MB/s | 5GB | 1.00 | IN USE |
| 1:01 | ARRAY GROUP TWO | 0MB/s | 10GB | 0.00 | NOT IN USE |
| 2:00 | ARRAY GROUP THREE | 25MB/s | 5GB | 5.00 | IN USE |
| 2:01 | ARRAY GROUP THREE | 0MB/s | 10GB | 0.00 | NOT IN USE |
|  |  |  |  |  |  |

VOLUME UTILIZATION STATE TABLE

FIG. 3

| ARRAY GROUP NAME (302A) | USABLE PERFORMANCE LIMIT (302B) | USABLE PERFORMANCE AMOUNT (302C) | CAPACITY (302D) | OPTIMUM PERFORMANCE DENSITY (302E) | USED PERFORMANCE AMOUNT (302F) | USED CAPACITY (302G) | USED PERFORMANCE DENSITY (302H) | FREE PERFORMANCE AMOUNT (302I) | FREE CAPACITY (302J) | FREE PERFORMANCE DENSITY (302K) |
|---|---|---|---|---|---|---|---|---|---|---|
| ARRAY GROUP ONE | 80 % | 500 MB/s | 500 GB | 1.00 | 300 MB/s | 300 GB | 1.00 | 200 MB/s | 200 GB | 1.00 |
| ARRAY GROUP TWO | 70 % | 400 MB/s | 500 GB | 0.80 | 200 MB/s | 400 GB | 0.50 | 200 MB/s | 100 GB | 2.00 |
| ARRAY GROUP THREE | 60 % | 500 MB/s | 400 GB | 1.25 | 400 MB/s | 200 GB | 2.00 | 100 MB/s | 200 GB | 0.50 |
| | | | | | | | | | | |

ARRAY GROUP UTILIZATION STATE TABLE — 302

FIG. 4

|  303A | 303B | 303C |
|---|---|---|
| ARRAY GROUP NAME | PRIORITY LEVEL | POST - RELOCATION USED PERFORMANCE DENSITY |
| ARRAY GROUP ONE | 2 | 1.03 (+0.03) |
| ARRAY GROUP TWO | 1 | 0.54 (−0.26) |
| ARRAY GROUP THREE | 3 | 2.00 (+0.75) |
|  |  |  |

ARRAY GROUP PRIORITY ORDER TABLE 303

FIG. 6

| 304A | 304B |
|---|---|
| VOLUME ID | PRIORITY LEVEL |
| 0:01 | 2 |
| 1:01 | 1 |
| 2:01 | 3 |
|  |  |

304

RELOCATION DESTINATION CANDIDATE VOLUME LIST TABLE

FIG. 7

RELOCATION DESTINATION VOLUME SELECTING SCREEN

RELOCATION DESTINATION VOLUME LIST

| | VOLUME ID (601A) | ASSIGNED ARRAY GROUP NAME (601B) | ARRAY GROUP USED PERFORMANCE DENSITY (601C) |
|---|---|---|---|
| ✓ | 1:01 | ARRAY GROUP TWO | 0.50 (−0.30) ⇒ 0.54 (−0.26) |
| ☐ | 0:01 | ARRAY GROUP ONE | 1.00 (±0.00) ⇒ 1.03 (+0.03) |
| ☐ | 2:01 | ARRAY GROUP THREE | 2.00 (+0.75) ⇒ 2.00 (+0.75) |
| | | | |

FIG. 9 601

RELOCATION DESTINATION ARRAY GROUP SELECTING SCREEN

RELOCATION DESTINATION ARRAY GROUP LIST

| | ARRAY GROUP NAME (602A) | OPTIMUM PERFORMANCE DENSITY (602B) | USED PERFORMANCE DENSITY (602C) |
|---|---|---|---|
| ✓ | ARRAY GROUP TWO | 0.80 | 0.50 (−0.30) ⇒ 0.54 (−0.26) |
| ☐ | ARRAY GROUP ONE | 1.00 | 1.00 (±0.00) ⇒ 1.03 (+0.03) |
| ☐ | ARRAY GROUP THREE | 1.25 | 2.00 (+0.75) ⇒ 2.00 (+0.75) |
| | | | |

FIG. 10 602

|  306A  |  306B  |  306C  |
| --- | --- | --- |
| ARRAY GROUP NAME | THRESHOLD | PERIOD |
| ARRAY GROUP ONE | 0.5 | 10 DAYS |
| ARRAY GROUP TWO | 1.0 | – |
| ARRAY GROUP THREE | – | 30 DAYS |
|  |  |  |

306

RELOCATION EXECUTION JUDGMENT TABLE

*FIG. 12*

| ORIGINAL VOLUME ID FROM WHICH DATA IS RELOCATED | RELOCATION DESTINATION ARRAY GROUP NAME |
|---|---|
| 0:01 | ARRAY GROUP TWO |
| 0:04 | ARRAY GROUP TWO |
| 0:08 | ARRAY GROUP FOUR |
| | |

305
RELOCATION VOLUME LIST TABLE

FIG. 13

| VOLUME ID 301A | ASSIGNED ARRAY GROUP NAME 301B | USED PERFORMANCE AMOUNT 301C | CAPACITY 301D | USED PERFORMANCE DENSITY 301E | ACTIVE / INACTIVE STATE 301F | REQUESTED PERFORMANCE AMOUNT 301G | REQUESTED PERFORMANCE DENSITY 301H |
|---|---|---|---|---|---|---|---|
| 0:00 | ARRAY GROUP ONE | 20MB/s | 10GB | 2.0 | IN USE | — | — |
| 1:00 | ARRAY GROUP ONE | 5MB/s | 5GB | 1.0 | IN USE | 10MB/s | 2.0 |
| 2:00 | ARRAY GROUP TWO | 25MB/s | 5GB | 5.0 | IN USE | 20MB/s | 4.0 |
| | | | | | | | |

301

VOLUME UTILIZATION STATE TABLE

FIG. 18

STORAGE SYSTEM CAPABLE OF RELOCATING DATA

CLAIM OF PRIORITY

The present application claims priority from Japanese patent application P2005-243974 filed on Aug. 25, 2005, the content of which is hereby incorporated by reference into this application.

BACKGROUND

This invention relates to a computer system including a storage subsystem, a host computer, and a management computer. In particular, this invention relates to a technique of relocating data stored in a storage subsystem.

Recent storage subsystems often take the form of a RAID disk array system where plural disks are integrated. With a RAID configuration, storage subsystems are improved in reliability and performance.

A RAID disk set is called an array group. Array groups virtually constitute logical volumes, and host servers access storage subsystems on a logical volume basis. When too many host servers access the same array group at the same time, the performance of all logical volumes belonging to the array group is lowered. To cope with this problem, several techniques have been proposed to avoid a flood of access to one array group.

One known example of such techniques is disclosed in JP 2003-140836 A. This technique is to set a performance limit to an array group and move data from the array group to another when the limit is exceeded. In this way, the array group can meet a performance level requested by a user.

Another known example is disclosed in JP 2005-050007 A. This technique is to relocate data in a manner that enables a storage subsystem to fully exert its performance potential. According to this technique, service levels are set to various resources of a storage subsystem, and data is relocated so that the set service levels are met. Various resources refer to a ratio of how much of a disk is consumed, a disk capacity, and the like.

SUMMARY

Those conventional techniques raise the following problems.

One is a possibility that frequently accessed data congregates in one array group. If the possibility becomes reality, then the performance of the array group reaches the limit before the available storage capacity is fully consumed. There is also the reverse possibility that infrequently accessed data congregates in one array group. In this case, even when using up all of the available storage capacity, the array group still cannot reach its highest possible performance level.

In short, prior art cannot make full use of I/O resource of an array group and capacity resource both. Such a situation could be avoided by asking a user to choose an array group as a data relocation destination. To choose a data relocation destination, the user needs to check the access frequency of each logical volume, capacity of each logical volume, the access frequency of each array group, and capacity of each array group, which is a laborious work for the user.

A recent increase in capacity of a storage subsystem, which enables the storage subsystem to store data of various performance characteristics and various capacity characteristics, is another factor that makes it difficult for a user to choose a data relocation destination so that an capacity resource of the array group and I/O resource are utilized to the fullest.

This invention has been made in view of the above problems, and it is therefore an object of this invention to place data appropriately.

In order to achieve the above object, this invention provides A computer system comprising: a storage system; a host computer connected to the storage system via a network; and a management computer connected to the storage system, wherein the storage system comprises a first interface connected to the network, a first processor connected to the first interface, a first memory connected to the first processor, and a disk drive where data written by the host computer is stored, wherein the host computer comprises a second interface connected to the network, a second processor connected to the second interface, and a second memory connected to the second processor, wherein the management computer comprises a third interface connected to the storage system, a third processor connected to the third interface, and a third memory connected to the third processor, wherein the second processor recognizes a storage area of the disk drive on a logical volume basis, wherein the first processor measures, for each logical volume, a storage capacity of the logical volume and a used I/O amount of the logical volume, which indicates a amount of a I/O resource used by the logical volume, and wherein the third processor has the following functions: manages the logical volumes in groups by storing the association relation between the logical volumes and groups in the third memory; obtains, via the third interface, the used I/O amount of the logical volume and storage capacity of the logical volume measured by the first processor; designates to a logical volume to which data is to be moved based on a ratio of the obtained used I/O amount of the logical volume to the obtained storage capacity of the logical volume; and instructs, via the third interface, the first processor to move data from the data's original logical volume to the logical volume designated as the destination of migration.

According to a embodiment of this invention, it becomes possible to place data in a storage subsystem appropriately. Thus the storage subsystem's capacity resource and I/O resource can be utilized effectively.

BRIEF DESCRIPTION OF THE DRAWINGS

The present invention can be appreciated by the description which follows in conjunction with the following figures, wherein:

FIG. 3 is a configuration diagram of a volume utilization state table of the storage management server according to the first embodiment of this invention;

FIG. 4 is a configuration diagram of an array group utilization state table of the storage management server according to the first embodiment of this invention;

FIG. 6 is a configuration diagram of an array group priority order table of the storage management server according to the first embodiment of this invention;

FIG. 7 is a configuration diagram of a relocation destination candidate volume list table of the storage management server according to the first embodiment of this invention;

FIG. 9 is an explanatory diagram of a relocation destination volume selecting screen, which is displayed by the storage management server according to the first embodiment of this invention;

FIG. 10 is an explanatory diagram of a relocation destination array group selecting screen, which is displayed by the storage management server according to the first embodiment of this invention;

FIG. 12 is a configuration diagram of a relocation execution judgment table of the storage management server according to the second embodiment of this invention;

FIG. 13 is a configuration diagram of a relocation volume list table of the storage management server according to the second embodiment of this invention;

FIG. 18 is a configuration diagram of a volume utilization state table of a storage management server according to a sixth embodiment of this invention.

DESCRIPTION OF THE PREFERRED EMBODIMENTS

Embodiments of this invention will be described below with reference to the accompanying drawings.

First Embodiment

Figure 1:
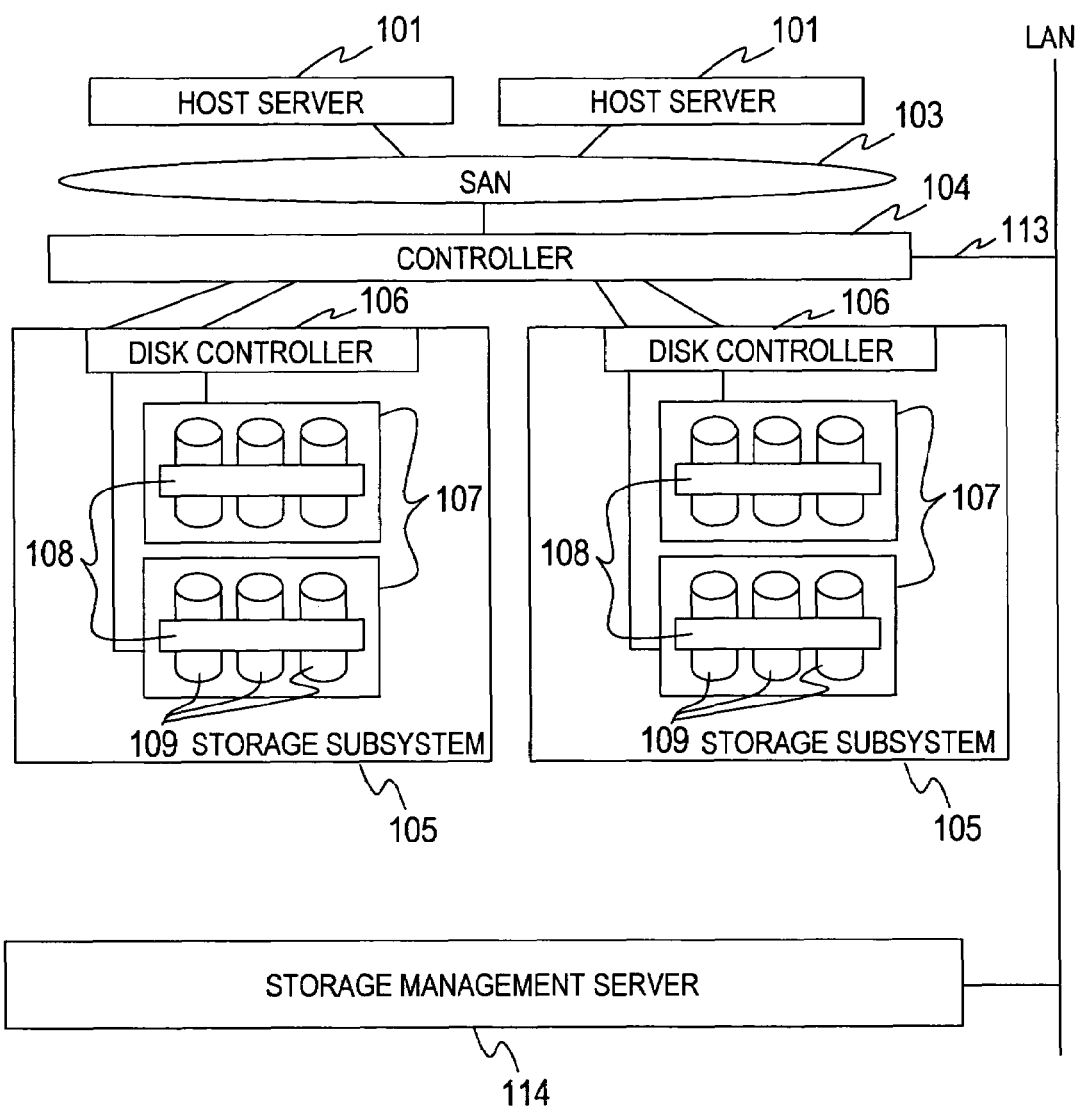
FIG. 1 is a block diagram of a computer system according to a first embodiment of this invention.

FIG. 1 is a block diagram of a computer system according to a first embodiment of this invention.

The computer system includes host servers 101, an SAN 103, a controller 104, storage subsystems 105, a storage management server 114, and a LAN 113.

Each host server 101 is connected to the controller 104 via the SAN 103. Instead of the SAN 103, other networks such as IP-SAN and NAS may be used to connect the host server 101 to the controller 104.

Each storage subsystem 105 has a disk controller 106 and physical disks 109. The disk controller 106 controls data input/output in the physical disks 109. The physical disks 109 constitute a RAID, and store data on an array group basis. Each array group is denoted by 107. The RAID configuration enhances the performance and reliability of the storage subsystem 105.

Each array group 107 includes one or more logical volumes 108. The host servers 101 recognize storage areas of the storage subsystems 105 as the logical volumes 108.

The controller 104 controls each storage subsystems 105. Specifically, the controller 104 controls data transfer between two logical volumes 108 and 108 of the same storage subsystem 105, or of two different storage subsystems 105 and 105. The controller 104 may be included in the disk controller 106 of each storage subsystem 105.

The controller 104 is connected to the storage management server 114 via the LAN 113.

The storage management server 114 handles, as will be described later with reference to FIG. 2, the overall management of the computer system.

Figure 2:
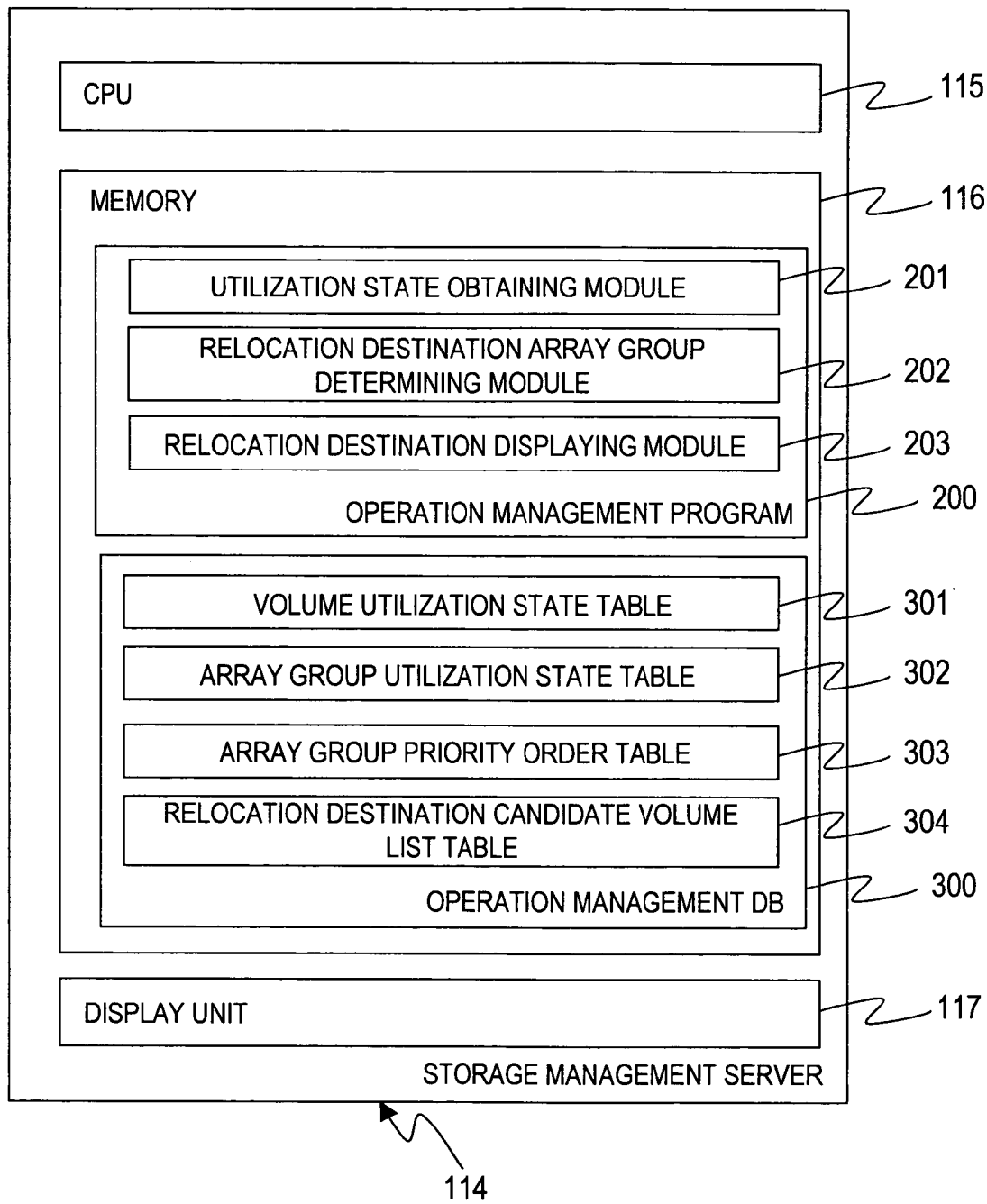
FIG. 2 is a block diagram of a storage management server according to the first embodiment of this invention.

FIG. 2 is a block diagram of the storage management server 114 according to the first embodiment of this invention.

The storage management server 114 has a CPU 115, a memory 116, and a display unit 117.

The CPU 115 executes programs stored in the memory 116 to thereby perform various types of processing. The memory 116 stores an operation management program 200 and an operation management database (operation management DB) 300.

The operation management program 200 manages arrangement of data stored in the logical volumes 108 of the storage subsystems 105. The operation management program 200 includes a utilization state obtaining module 201, a relocation destination array group determining module 202, and a relocation destination displaying module 203.

The utilization state obtaining module 201 obtains the utilization state of the logical volumes 108 of the storage subsystems 105 and stores the obtained state in the operation management DB 300. The relocation destination array group determining module 202 chooses, as will be described in detail with reference to FIG. 8, one array group 107 to which requested data is to be relocated. The relocation destination displaying module 203 causes, as will be described in detail with reference to FIG. 8, the display unit 117 to display information on the array group 107 that is chosen by the relocation destination array group determining module 202.

The operation management DB 300 includes a volume utilization state table 301, an array group utilization state table 302, an array group priority order table 303, and a relocation destination candidate volume list table 304.

The volume utilization state table 301 holds, as will be described later with reference to FIG. 3, utilization state information of the logical volumes 108 in the storage subsystems 105. The array group utilization state table 302 holds, as will be described later with reference to FIG. 4, utilization state information of the array groups 107 to which the logical volumes 108 belong.

The array group priority order table 303 holds, as will be described later with reference to FIG. 6, utilization state information of the array groups 107 after data relocation. The relocation destination candidate volume list table 304 holds, as will be described later with reference to FIG. 7, information on the priority order of the logical volumes 108. The logical volumes 108 having higher priority levels are more suitable as data relocation destinations.

FIG. 3 is a configuration diagram of the volume utilization state table 301 of the storage management server 114 according to the first embodiment of this invention.

The volume utilization state table 301 includes a volume ID 301A, an assigned array group name 301B, a used I/O amount 301C, a capacity 301D, a used I/O density 301E, and an active/inactive state 301F.

The volume ID 301A indicates an identifier unique to each logical volume 108 of the storage subsystems 105. The assigned array group name 301B indicates an identifier unique to the array group 107 to which the logical volume 108 identified by the logical volume ID 301A belongs.

The used I/O amount 301C indicates the used amount of a I/O resource of this logical volume 108, and is expressed by a transfer rate in data write, a transfer rate in data read, an I/O per second (IOPS), or the like. The explanatory diagram of FIG. 3 employs a transfer rate in data write as the used I/O amount 301C.

The capacity 301D indicates the capacity of the storage area of this logical volume 108.

The used I/O density 301E indicates, as will be described later with reference to FIG. 5, the ratio of the used I/O amount to capacity of this logical volume 108. Specifically, the used I/O density 301E is obtained by dividing the used I/O amount 301C by the capacity 301D.

The active/inactive state 301F indicates whether this logical volume 108 stores data or not. When there is data stored in the logical volume 108, "in use" is entered as the active/inactive state 301F, whereas "not in use" is entered as the active/inactive state 301F when there is no data stored in the logical volume 108.

Described next is processing of updating the volume utilization state table 301. The operation management program 200 may update the volume utilization state table 301 either upon execution of data relocation processing, or periodically.

The disk controller 106 of each storage subsystem 105 has plural ports connected to the SAN 103, and controls I/O for each port. The disk controller 106 also stores configuration information of the array groups 107. The array group configuration information includes information about which logical volume 108 is assigned to which array group 107, information on the capacities of the logical volumes 108, and the active/inactive state of the logical volumes 108.

The disk controller 106 monitors the I/O amount of each logical volume 108. The I/O amount is expressed by a data transfer rate in writing in each logical volume 108, the I/O count of each logical volume 108, or the like. The disk controller 106 stores the obtained I/O amount along with a volume ID assigned to the logical volume 108.

The operation management program 200 of the storage management server 114 obtains the volume ID and the I/O amount that are stored in the disk controller 106 of the storage subsystem 105.

Next, the operation management program 200 chooses, from the volume utilization state table 301, a record entry whose volume ID 301A of the volume utilization state table 301 matches the obtained volume ID. The operation management program 200 then enters the I/O amount obtained from the disk controller 106 as the used I/O amount 301C of the chosen record entry.

Obtained next from the disk controller 106 is the name of an array group to which the volume that has the obtained volume ID belongs. The array group name obtained from the disk controller 106 is entered as the assigned array group name 301 B of the chosen record entry.

Obtained next from the disk controller 106 is the storage capacity of the volume that has the obtained volume ID. The storage capacity obtained from the disk controller 106 is entered as the capacity 301D of the chosen record entry.

Then the operation management program 200 divides the used I/O amount 301C by the capacity 301D, and enters the quotient as the used I/O density 301E.

The operation management program 200 next obtains, from the disk controller 106, the active/inactive state of the volume that has the obtained volume ID. The active/inactive state obtained from the disk controller 106 is entered as the active/inactive state 301F of the chosen record entry.

FIG. 4 is a configuration diagram of the array group utilization state table 302 of the storage management server 114 according to the first embodiment of this invention.

The array group utilization state table 302 includes an array group name 302A, a usable performance limit 302B, a usable I/O amount 302C, a capacity 302D, an optimum I/O density 302E, a used I/O amount 302F, a used capacity 302G, a used I/O density 302H, a free I/O amount 302I, a free capacity 302J and a free I/O density 302K.

The array group name 302A indicates an identifier unique to each array group 107 to which the logical volumes 108 belong.

The usable performance limit 302B indicates the ratio of an actually usable I/O resource capacity to the total I/O resource capacity of the array group 107 identified by the array group name 302A. The usable performance limit 302B is set by a user. The user sets the usable performance limit 302B taking into consideration the RAID configuration of this array group 107 and/or the active/inactive state of the logical volumes 108, and other factors.

The usable I/O amount 302C indicates how much of the capacity of this array group 107 can actually be put into use, namely, the upper limit of the usable I/O amount. The array group 107 cannot use more I/O resource than the usable I/O amount 302C. The usable I/O amount 302C is calculated by multiplying the maximum I/O amount of this array group 107 by the usable performance limit 302B.

The capacity 302D indicates the capacity of the storage area of this array group 107. In other words, the capacity 302D indicates the sum of storage capacities of the logical volumes 108 that belong to this array group 107.

The optimum I/O density 302E indicates, as will be described later with reference to FIG. 5, an optimum ratio of the usable I/O amount to capacity of this array group 107. Specifically, the optimum I/O density 302E is obtained by dividing the usable I/O amount 302C by the capacity 302D.

The used I/O amount 302F indicates a currently used I/O resource capacity of this array group 107. In other words, the used I/O amount 302F indicates the sum of the used I/O amounts of the logical volumes 108 that belong to this array group 107 and are currently in use.

The used capacity 302G indicates how much storage area capacity of this array group 107 is currently in use. In other words, the used capacity 302G indicates the sum of the capacities of the logical volumes 108 that belong to this array group 107 and are currently in use.

The used I/O density 302H indicates, as will be described later with reference to FIG. 5, the ratio of the used I/O amount to used capacity of this array group 107. Specifically, the used I/O density 302H is obtained by dividing the used I/O amount 302F by the used capacity 302G.

The free I/O amount 302I indicates a I/O resource capacity of this array group 107 that is currently not in use. Specifically, the free I/O amount 302I is obtained by subtracting the used I/O amount 302F from the usable I/O amount 302C.

The free capacity 302J indicates how much storage area capacity of this array group 107 is currently not in use. Specifically, the free capacity 302J is obtained by subtracting the used capacity 302G from the capacity 302D.

The free I/O density 302K indicates, as will be described later with reference to FIG. 5, the ratio of the free I/O amount to free capacity of this array group 107. Specifically, the free I/O density 302K is obtained by dividing the free I/O amount 302I by the free capacity 302J.

Described next is processing of updating the array group utilization state table 302. The operation management program 200 may update the array group utilization state table 302 either upon execution of data relocation processing, or periodically.

The operation management program 200 obtains a volume ID and a I/O amount which are stored in the disk controller 106 of each storage subsystem 105. The operation management program 200 also obtains the configuration information of the relevant array group 107 from the disk controller 106.

From the array group utilization state table 302, a record entry that is to be updated with new information is chosen. The operation management program 200 next chooses, from the volume utilization state table 301, every record entry whose assigned array group name 301B matches the array group name 302A of the chosen record entry. Then the capacity 301D of every chosen record entry is added up. The obtained sum is entered as the capacity 302D in the array group utilization state table 302.

Then the usable I/O amount 302C is divided by the capacity 302D. The quotient is entered as the optimum I/O density 302E in the array group utilization state table 302.

The operation management program 200 next obtains, from the volume utilization state table 301, every record entry whose assigned array group name 301B matches the array group name 302A of the record entry to be updated and whose active/inactive state 301F is read as "in use". The used I/O amount 301C of every chosen record entry is added up, and the obtained sum is entered as the used I/O amount 302F in the array group utilization state table 302.

The capacity 301D of every record entry chosen from the volume utilization state table 301 is added up, and the obtained sum is entered as the used capacity 302G in the array group utilization state table 302.

Then the used I/O amount 302F is divided by the used capacity 302G. The quotient is entered as the used I/O density 302H in the array group utilization state table 302.

The operation management program 200 next obtains, from the volume utilization state table 301, every record entry whose assigned array group name 301B matches the array group name 302A of the record entry to be updated and whose active/inactive state 301F is read as "not in use". The used I/O amount 301C of every chosen record entry is added up, and the obtained sum is entered as the free I/O amount 302I in the array group utilization state table 302.

The capacity 301D of every record entry chosen from the volume utilization state table 301 is added up, and the obtained sum is entered as the used capacity 302J in the array group utilization state table 302.

Then the free I/O amount 302I is divided by the free capacity 302J. The quotient is entered as the free I/O density 302K in the array group utilization state table 302.

Figure 5:
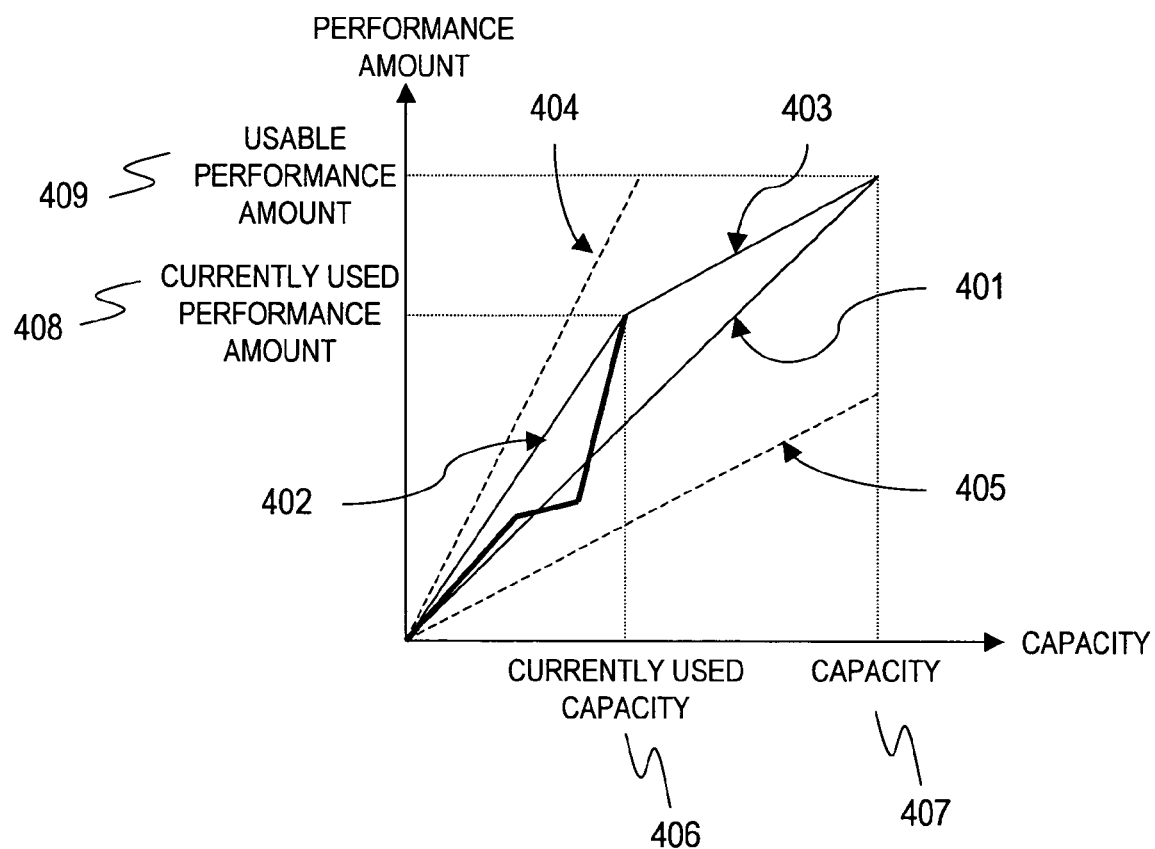
FIG. 5 is an explanatory diagram of I/O density according to the first embodiment of this invention.

FIG. 5 is an explanatory diagram of I/O density according to the first embodiment of this invention.

The explanatory diagram of FIG. 5 is a graph showing the relation between the used amount of a I/O resource (I/O amount) of the array group 107 and the used amount of a capacity resource (capacity) of the array group 107. In the graph, the vertical axis represents the I/O amount and the horizontal axis represents the capacity.

The array group 107 is using a I/O resource in an amount indicated by a currently used I/O amount 408. This array group 107 is allowed to use the I/O resource up through an amount indicated by a usable I/O amount 409.

In terms of capacity resource, this array group 107 is using a capacity resource at a level indicated by a currently used capacity 406, and can use the capacity resource up through a level indicated by a capacity 407.

Then the used I/O density of this array group 107 is expressed by the slant of a line segment 402, the free I/O density of the array group 107 is expressed by the slant of a line segment 403, and the optimum I/O density of the array group 107 is expressed by the slant of a line segment 401.

In this embodiment, the storage management server 114 gives a data relocation instruction based on the free I/O density of the array group 107. This, way the storage management server 114 can make the used I/O density of the array group 107 closer to its optimum I/O density. This enables the storage subsystem 105 to use a I/O resource and capacity resource of the array group 107 efficiently.

The slants of line segments 404 and 405 represent I/O density thresholds. The line segments 404 and 405 will be described in a second embodiment of this invention.

FIG. 6 is a configuration diagram of the array group priority order table 303 of the storage management server 114 according to the first embodiment of this invention.

The array group priority order table 303 includes an array group name 303A, a priority level 303B, and a post-relocation used I/O density 303C.

The array group name 303A indicates an identifier unique to each array group 107 to which the logical volumes 108 belong.

The priority level 303B indicates a degree of suitableness as a data relocation destination that is assigned to the array group 107 indicated by the array group name 303A. The array group 107 is more suitable as a data relocation destination when the priority level 303B is higher.

The post-relocation used I/O density 303C indicates this array group's used I/O density after data is relocated to this array group 107. The field for the post-relocation used I/O density 303C also holds the difference between this array group's used I/O density and optimum I/O density after data is relocated to this array group 107.

FIG. 7 is a configuration diagram of the relocation destination candidate volume list table 304 of the storage management server 114 according to the first embodiment of this invention.

The relocation destination candidate volume list table 304 includes a volume ID 304A and a priority level 304B.

The volume ID 304A indicates an identifier unique to each logical volume 108 of the storage subsystems 105. The priority level 304B indicates a degree of suitableness as a data relocation destination that is assigned to the logical volume 108 indicated by the volume ID 304A. The logical volume 108 is more suitable as a data relocation destination when the priority level 304B is higher.

Figure 8:
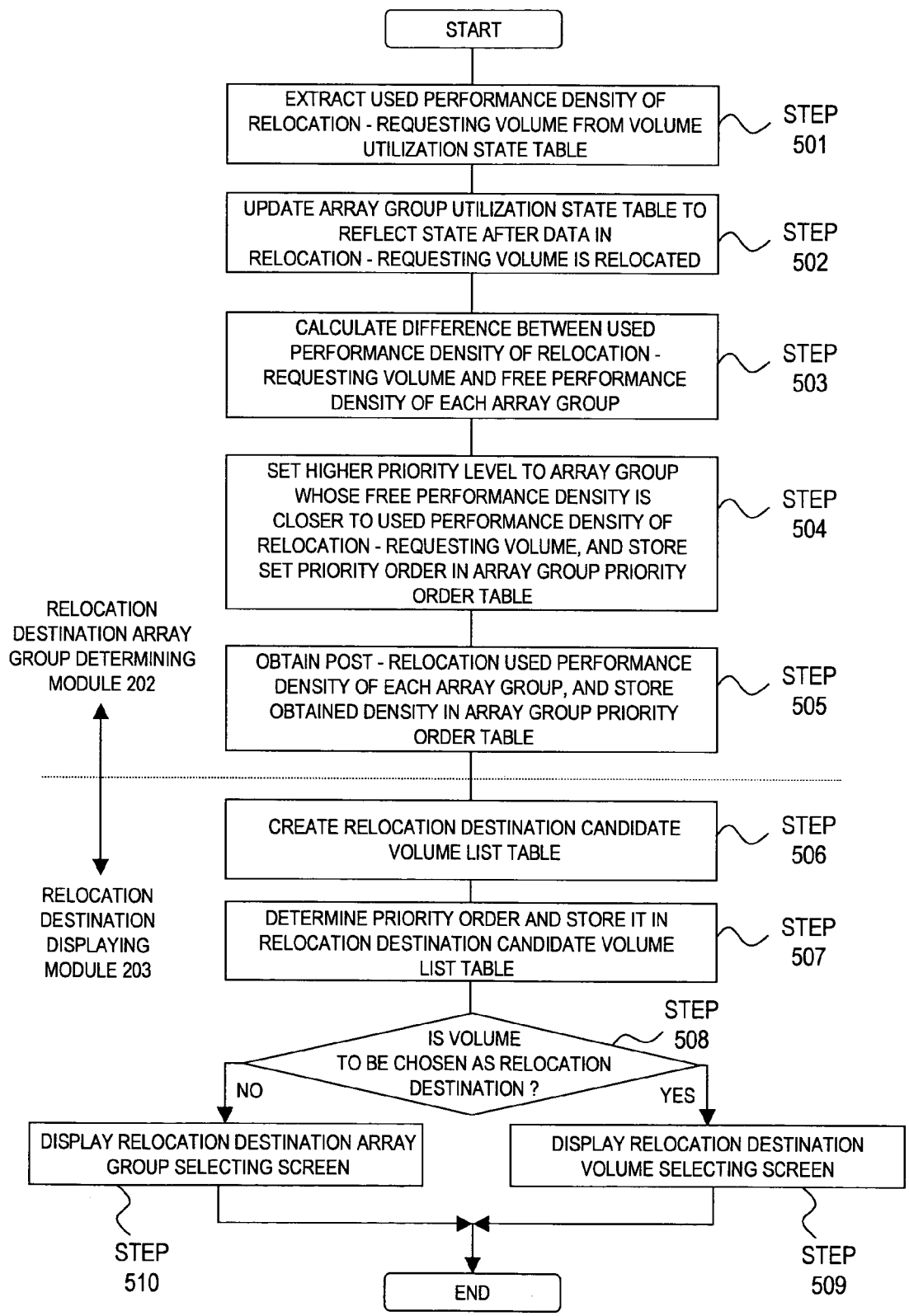
FIG. 8 is a flow chart for a relocation destination array group determining module and a relocation destination displaying module, which are provided in the storage management server according to the first embodiment of this invention.

FIG. 8 is a flow chart for the relocation destination array group determining module 202 and the relocation destination displaying module 203, which are provided in the storage management server 114 according to the first embodiment of this invention.

A user requests the operation management program 200 to relocate data, designating the logical volume 108 from which data is to be relocated (relocation-requesting volume).

Receiving the request, the operation management program 200 chooses, from the volume utilization state table 301, a record entry whose volume ID 30 1A matches the volume ID of the relocation-requesting volume. From the chosen record entry, the used I/O density 301E is extracted (Step 501).

Next, the used I/O amount 301C and the capacity 301D are extracted from the chosen record entry, the assigned array group name 301B. The operation management program 200 chooses, from the array group utilization state table 302, a record entry whose array group name 302A matches the assigned array group name 301B extracted.

The used I/O amount 301C extracted from the volume utilization state table 301 is subtracted from the used I/O amount 302F of the chosen record entry. The capacity 301D extracted from the volume utilization state table 301 is subtracted from the used capacity 302G of the chosen record entry. Then the used I/O amount 302F of this record entry is divided by the used capacity 302G of this record entry. The quotient is entered as the used I/O density 302H.

Next, the used I/O amount 301C extracted from the volume utilization state table 301 is added to the free I/O amount 302I of the chosen record entry. The capacity 301D extracted from the volume utilization state table 301 is added to the free capacity 302J of the chosen record entry. Thereafter, the free I/O amount 302I of this record entry is divided by the free capacity 302J of this record entry, and the quotient is entered as the free I/O density 302K.

The array group utilization state table 302 is thus updated to reflect a state after data in the relocation-requesting volume is relocated (Step 502).

The operation management program 200 next creates the array group priority order table 303 about the relocation-requesting volume as shown in FIG. 6.

Specifically, record entries of the array group utilization state table 302 are chosen one by one starting from the top and proceeding downward. The operation management program 200 then calculates the difference between the used I/O density 301E extracted in the step S501 and the free I/O density 302K of the chosen record entry (Step 503). In this fashion, all record entries of the array group utilization state table 302 are sequentially chosen to calculate the difference between the used I/O density 301E and the free I/O density 302K.

The operation management program 200 next sets a priority level to each array group 107. Specifically, a higher priority level is set to the array group 107 whose free I/O density 302K is closer to the used I/O density 301E based on the result of calculating the difference between the used I/O density 301E and the free I/O density 302K.

The set priority level is entered as the priority level 303B in the array group priority order table 303 (Step 504).

Next, the operation management program 200 chooses record entries of the array group utilization state table 302 one by one starting from the top and proceeding downward. From each chosen record entry, the operation management program 200 extracts the used I/O amount 302F, the used capacity 302G, and the used I/O density 302H.

To the used I/O amount 302F extracted, the operation management program 200 adds the used I/O amount 301C extracted from the volume utilization state table 301 in the step S502. Thus calculated is a used I/O amount of when data relocation to this array group 107 is completed.

To the used capacity 302G extracted, the operation management program 200 adds the capacity 301D extracted from the volume utilization state table 301 in the step S502. Thus calculated is a used capacity of when data relocation to this array group 107 is completed.

The calculated used I/O amount is divided by the calculated used capacity, thereby obtaining a used I/O density of when data relocation to this array group 107 is completed. The calculated used I/O density is entered as the post-relocation used I/O density 303C in the array group priority order table 303.

The operation management program 200 then calculates the difference between the post-relocation used I/O density 303C entered and the used I/O density 302H extracted from the array group utilization state table 302. Thus calculated is how much the used I/O density is changed by data relocation to this array group 107. The calculated amount of change is entered in a field for the amount of change of the used I/O density 303C in the array group priority order table 303.

In this fashion, all record entries of the array group utilization state table 302 are sequentially chosen to calculate the used I/O density of when data relocation to the array group 107 in question is completed and how much the used I/O density is changed by the data relocation. The calculated used I/O density and the calculated amount of change of the used I/O density are stored in the array group priority order table 303 (Step 505).

Next, the operation management program 200 creates the relocation destination candidate volume list table 304 about the relocation-requesting volume (Step 506).

Specifically, the operation management program 200 chooses, from the volume utilization state table 301, every record entry whose active/inactive state 301F is read as "not in use". From each record entry chosen, the volume ID 301A and the assigned array group name 301B are extracted.

The extracted volume ID 301A is stored as the volume ID 304A in the relocation destination candidate volume list table 304.

The operation management program 200 next chooses, from the array group priority order table 303, a record entry whose array group name 303A matches the assigned array group name 301B extracted. From the chosen record entry, the priority level 303B is extracted. The extracted priority level is entered as the priority level 304B in the relocation destination candidate volume list table 304 (Step 507).

The operation management program 200 next has the user specify either the logical volume 108 or the array group 107 as a destination of data to be relocated from the relocation-requesting volume (Step 508).

When the user specifies to select a relocation destination from the logical volumes 108, the operation management program 200 makes a relocation destination volume selecting screen displayed (Step 509).

FIG. 9 is an explanatory diagram of a relocation destination volume selecting screen 601, which is displayed by the storage management server 114 according to the first embodiment of this invention.

The relocation destination volume selecting screen 601 includes a volume ID 601A, an assigned array group name 601B, and an array group used I/O density 601C.

The volume ID 601A indicates an identifier unique to each logical volume 108 of the storage subsystems 105. The assigned array group name 601B indicates an identifier unique to the array group 107 to which the logical volume 108 identified by the logical volume ID 601A belongs.

The field for the array group used I/O density 601C holds a pre-data relocation used I/O density of this array group 107 and a post-data relocation used I/O density of this array group 107. Also the difference between the used I/O density and optimum I/O density of this array group 107 is included in the field for the array group used I/O density 601C.

To give an example, the logical volume 108 that has as the volume ID 601A "1:01" belongs to "Array Group Two". The used I/O density of the array group 107 to which this logical volume 108 belongs is "0.50". The difference between the used I/O density and optimum I/O density of this array group 107 is "−0.30".

In the case where this logical volume 108 is chosen as a volume to where data in the relocation-requesting volume migrates, the used I/O density of the array group 107 to which this logical volume 108 belongs changes from "0.50" to "0.54". The difference between the used I/O density and optimum I/O density of this array group 107 changes from "−0.30" to "−0.26".

Now, a description is given on processing executed by the operation management program 200 to create a relocation destination volume selecting screen.

First, the operation management program 200 extracts, from the relocation destination candidate volume list table 304, the volume ID 304A of the record entry whose priority level 304B is the highest and then the volume ID 304A of the rest of the record entries one at a time in descending order of priority. The extracted volume ID 304A is entered as the volume ID 601A on the relocation destination volume selecting screen 601.

Next, the operation management program 200 chooses, from the volume utilization state table 301, a record entry whose volume ID 301A matches the entered volume ID 601A. From the chosen record entry, the assigned array group name 301B is extracted.

The assigned array group name 301B extracted is entered as the assigned array group name 601 B on the relocation destination volume selecting screen 601.

The operation management program 200 then chooses, from the array group utilization state table 302, a record entry whose array group name 302A matches the assigned array group name 601B entered. From the chosen record entry, the optimum I/O density 302E and the used I/O density 302H are extracted. The optimum I/O density 302E extracted is subtracted from the used I/O density 302H extracted. The result of the subtraction and the used I/O density 302H extracted are stored in a current state field for the array group used I/O density 601C on the relocation destination volume selecting screen 601.

The operation management program 200 next chooses, from the array group priority order table 303, a record entry whose array group name 303A matches the assigned array group name 601B stored. From the chosen record entry, the post-relocation used I/O density 303C is extracted. The post-relocation used I/O density 303C extracted is stored in a post-data relocation state field for the array group used I/O density 601C on the relocation destination volume selecting screen 601.

Returning to FIG. 8, the user studies the relocation destination volume selecting screen 601 displayed by the storage management server 114, and chooses one of the logical volumes 108 as a relocation destination volume, the destination of data relocated from the relocation-requesting volume.

Once the user chooses a relocation destination volume, the operation management program 200 sends a data relocation request to the controller 104. The data relocation request includes the volume ID of the relocation-requesting volume and the volume ID of the selected relocation destination volume.

Receiving the data relocation request, the controller 104 extracts the volume ID of the relocation-requesting volume and the volume ID of the relocation destination volume from the received relocation request. The controller 104 moves data from the relocation-requesting volume to the relocation destination volume, thereby completing data relocation.

Meanwhile, the operation management program 200 chooses, from the volume utilization state table 301, a record entry whose volume ID 301A matches the volume ID of the relocation destination volume selected by the user. From the chosen record entry, the assigned array group name 301B, the used I/O amount 301C and the capacity 301D are extracted.

The operation management program 200 next chooses, from the array group utilization state table 302, a record entry whose array group name 302A matches the assigned array group name 301B extracted.

To the used I/O amount 302F of the chosen record entry, the operation management program 200 adds the used I/O amount 301C extracted from the volume utilization state table 301. To the used capacity 302G of the chosen record entry, the operation management program 200 adds the capacity 301D extracted from the volume utilization state table 301. Thereafter, the used I/O amount 302F of this record entry is divided by the used capacity 302G of this record. The quotient is entered as the used I/O density 302H.

The operation management program 200 next subtracts, from the free I/O amount 302I of the chosen record entry, the used I/O amount 301C extracted from the volume utilization state table 301. The capacity 301D extracted from the volume utilization state table 301 is subtracted from the free capacity 302J of the chosen record entry. Thereafter, the free I/O amount 302I of this record entry is divided by the free capacity 302J of this record entry. The quotient is entered as the free I/O density 302K.

The operation management program 200 updates the array group utilization state table 302 in the manner described above, at which point the data relocation processing is ended.

In the case where the user specifies, in the step S508, to select a relocation destination from the array groups 107, the operation management program 200 makes a relocation destination array group selecting screen displayed (Step 510).

FIG. 10 is an explanatory diagram of a relocation destination array group selecting screen 602, which is displayed by the storage management server 114 according to the first embodiment of this invention.

The relocation destination array group selecting screen 602 includes an array group name 602A, an optimum I/O density 602B, and a used I/O density 602C.

The array group name 602A indicates an identifier unique to each array group 107. The optimum I/O density 602B indicates an optimum ratio of the I/O amount to a capacity of the array group 107 identified by the array group name 602A.

The field for the used I/O density 602C holds a pre-data relocation used I/O density of this array group 107 and a post-data relocation used I/O density of this array group 107. Also a difference between the used I/O density and the optimum I/O density of this array group 107 is included in the field for the used I/O density 602C.

The following description takes as an example a record entry that has "Array Group Two" as the array group name 602A. The optimum I/O density 602B of this array group 107 is "0.80". The used I/O density of this array group 107 is "0.50". The difference between the used I/O density and the optimum I/O density of this array group 107 is "–0.30".

In the case where this Array Group Two 107 is chosen as a volume to where data in the relocation-requesting volume migrates, the used I/O density of the array group 107 to which this logical volume 108 belongs changes from "0.50" to "0.54". The difference between the used I/O density and the optimum I/O density of this array group changes from "–0.30" to "–0.26".

Now, a description is given on processing executed by the operation management program 200 to create a relocation destination group selecting screen.

First, the operation management program 200 extracts, from the array group priority order table 303, the array group name 303A of the record entry whose priority level 303B is the highest, and then the array group name 303A of the rest of the record entries one at a time in ascending order of priority. The extracted array group name 303A is entered as the array group name 602A on the relocation destination array group selecting screen 602.

Next, the operation management program 200 chooses, from the volume utilization state table 302, a record entry whose array group name 302A matches the array group name 602A. From the chosen record entry, the optimum I/O density 302E and the used I/O density 302H are extracted.

The optimum I/O density 302E extracted is entered as the optimum I/O density 602A on the relocation destination array group selecting screen 602.

The optimum I/O density 302E extracted is subtracted from the used I/O density 302H extracted. The result of the subtraction and the used I/O density 302H extracted are stored in a current state filed for the used I/O density 602C on the relocation destination array group selecting screen 602.

The operation management program 200 next chooses, from the array group priority order table 303, a record entry whose array group name 303A matches the stored array group name 602A. From the chosen record entry, the post-relocation used I/O density 303C is extracted. The post-relocation used I/O density 303C extracted is stored in a post-data relocation field for the used I/O density 602C on the relocation destination volume selecting screen 602.

Returning to FIG. 8, the user studies the relocation destination array group selecting screen 602 displayed by the storage management server 114, and chooses one of the array groups 107 as a relocation destination array group, the destination of data relocated from the relocation-requesting volume.

Once the user chooses a relocation destination array group, the operation management program 200 chooses an arbitrary logical volume 108 from the relocation destination array group, and sets the chosen logical volume 108 as a relocation destination volume.

The operation management program 200 sends a data relocation request to the controller 104. The data relocation request includes the volume ID of the relocation-requesting volume and the volume ID of the selected relocation destination volume.

Receiving the data relocation request, the controller 104 extracts the volume ID of the relocation-requesting volume and the volume ID of the relocation destination volume from the received relocation request. The controller 104 moves data from the relocation-requesting volume to the relocation destination volume, thereby completing data relocation.

The operation management program 200 updates the array group utilization state table 302. The array group utilization state table 302 is updated by the above-described processing of the step S509, and the description is not repeated here.

Then, the operation management program 200 ends the data relocation processing.

The relocation destination array group determining module 202 handles the processing of the steps S501 to S505 of FIG. 8. The relocation destination displaying module 203 handles the processing of the steps S506 to S510 of FIG. 8.

When requesting the operation management program 200 to relocate data, the user may specify which array group 107 is to serve as the relocation destination of the data. In this case, the operation management program 200 sets a priority level only to the array group 107 that is designated by the user. Then, the operation management program 200 displays the relocation destination volume selecting screen 601 or the relocation destination array group selecting screen 602 in a manner that makes the screen include only information about the designated array group 107. In this way, the operation management program 200 can remove a specific array group 107, for example, one to be used as an archive, from a list of possible relocation destinations.

The storage management server 114 of this embodiment sets a higher priority level to the array group 107 whose free I/O density is closer to the used I/O density of the relocation-requesting volume. The array groups 107 are displayed in descending order of priority, so that the user can choose the array group 107 that has a higher priority level as a data relocation destination. Through repetition of this process, the storage management server 114 makes the used I/O density of each array group 107 closer to its optimum I/O density. Thus, the storage subsystem 105 can make full use of a I/O resource and a capacity resource.

Second Embodiment

A computer system of the second embodiment relocates data automatically. The computer system of the second embodiment has the same configuration as the computer system of the first embodiment shown in FIG. 1, except the storage management server 114, and a description on the common part is omitted.

Figure 11:
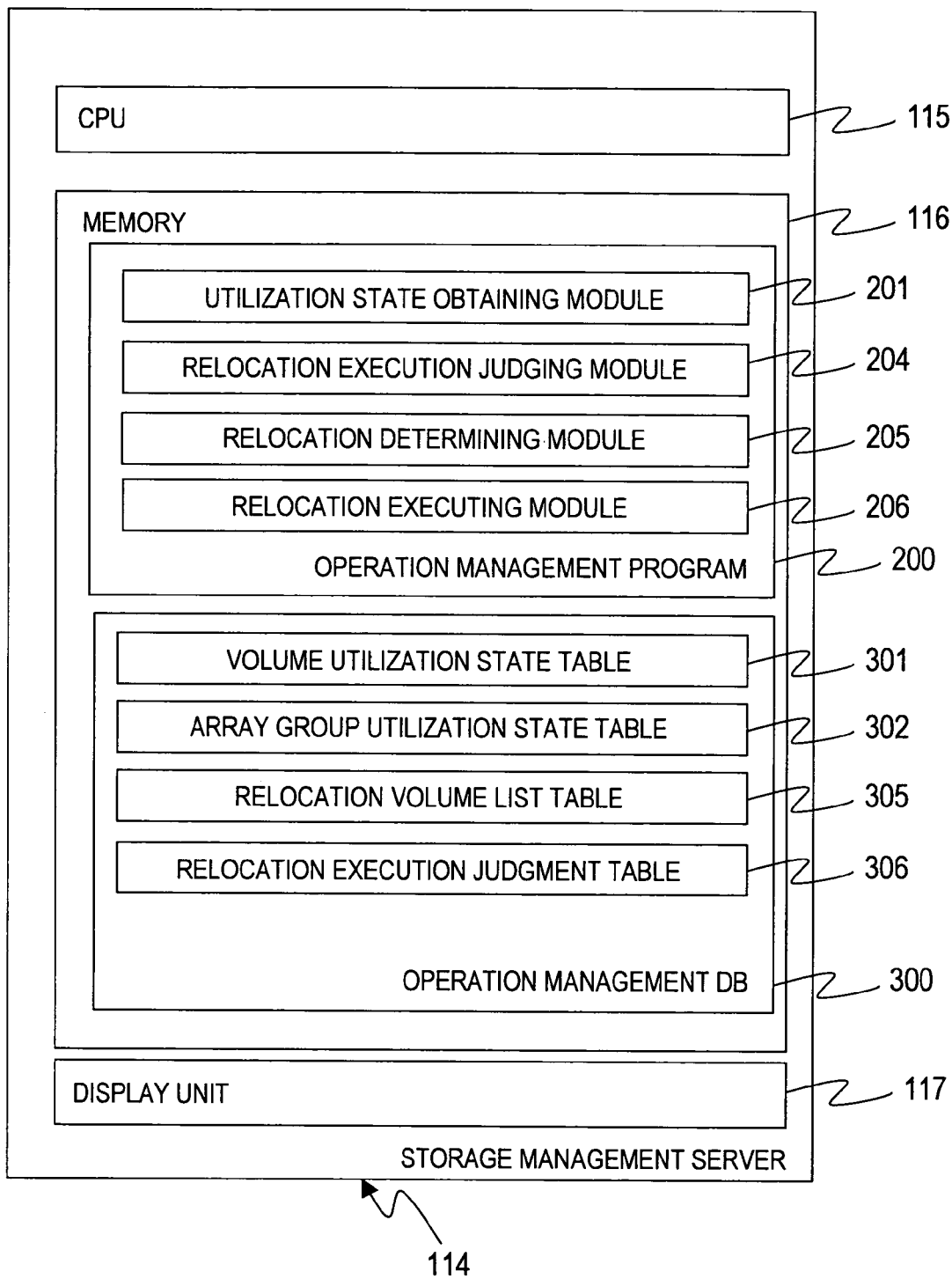
FIG. 11 is a block diagram of a storage management server according to a second embodiment of this invention.

FIG. 11 is a block diagram of the storage management server 114 according to the second embodiment of this invention.

The storage management server 114 of the second embodiment is the same as the storage management server of the first embodiment shown in FIG. 2, except for programs and information included in the memory 116. Components common to the storage management servers of the first and second embodiments will be denoted by the same reference symbols, and descriptions thereof will be omitted.

The memory 116 stores the operation management program 200 and the operation management DB 300.

The operation management program 200 includes the utilization state obtaining module 201, a relocation execution judging module 204, a relocation determining module 205, and a relocation executing module 206.

The utilization state obtaining module 201 handles the same processing as performed by the operation management program of the first embodiment, and a description thereof will be omitted.

The relocation execution judging module 204 judges whether to execute the relocation determining module 205 and the relocation executing module 206. The relocation determining module 205 determines, as will be described later with reference to FIGS. 13A to 13C, from which logical volume 108 to which array group 107 data is to be relocated. The relocation executing module 206 instructs, as will be described later with reference to FIG. 13D, the controller 104 to execute data relocation.

The operation management DB 300 includes a volume utilization state table 301, an array group utilization state table 302, a relocation execution judgment table 306, and a relocation volume list table 305.

The volume utilization state table 301, and the array group utilization state table 302 are the same as those in the storage management server 114 of the first embodiment. Accordingly, descriptions on these tables will be omitted.

The relocation execution judgment table 306 is, as will be described with reference to FIG. 12, for managing when to execute data relocation for each array group 107.

FIG. 12 is a configuration diagram of the relocation execution judgment table 306 of the storage management server 114 according to the second embodiment of this invention.

The relocation execution judgment table 306 includes an array group name 306A, a threshold 306B and a period 306C.

The array group name 306A indicates an identifier unique to each array group 107.

The threshold 306B indicates when to execute data relocation for the array group 107 identified by the array group name 306A. Specifically, the operation management program 200 executes the relocation determining module 205 and the relocation executing module 206 for this array group 107 when the difference between the used I/O density and the optimum I/O density exceeds the threshold 306B.

Next, how a threshold is set for the difference between the used I/O density and the optimum I/O density will be described with reference to FIG. 5.

The difference between the used I/O density and the optimum I/O density corresponds to the difference between the slant of the line segment 402 and the slant of the line segment 401. A threshold for the used I/O density can therefore be expressed with the line segments 404 and 405.

To elaborate, when the slant of the line segment 402 which represents the used I/O density is more than the slant of the line segment 404, the operation management program 200 executes the relocation determining module 205 and the relocation executing module 206 for the array group 107 in question. Similarly, when the slant of the line segment 402 which represents the used I/O density is less than the slant of the line segment 405, the operation management program 200 executes the relocation determining module 205 and the relocation executing module 206 for the array group 107 in question.

The operation management program 200 relocates data of one array group 107 when the difference between the used I/O density and optimum I/O density of this array group 107 becomes large.

In this way, the operation management program 200 makes the used I/O density equalized.

Returning to FIG. 12, the threshold 306B may indicate, for example, a threshold for the difference between an array group's optimum used I/O amount and used I/O amount. An optimum used I/O amount is determined in accordance with the used capacity of the array group in question.

The period 306C indicates when to execute data relocation for this array group 107. Specifically, the operation management program 200 executes the relocation determining module 205 and the relocation executing module 206 when the time counted from the last data relocation of the array group 107 is longer than the period 306C.

In short, the operation management program 200 periodically relocates data of the array group 107. Thus the operation management program 200 equalizes the used I/O density periodically.

The operation management program 200 may execute the relocation determining module 205 and the relocation executing module 206 at other timing than the one written in the relocation execution judgment table 306.

For instance, the operation management program 200 periodically compares the used I/O density 302F of the array group utilization state table 302 with the usable I/O amount 302C of the array group utilization state table 302. When the used I/O density 302F of the array group utilization state table 302 exceeds the usable I/O amount 302C of the array group utilization state table 302, the operation management program 200 executes the relocation determining module 205 and the relocation executing module 206 for the array group 107 in question.

In this case, the operation management program 200 relocates data of the array group 107 in a manner that reduces the used I/O density 302F lower than the usable I/O amount 302C.

Alternatively, the operation management program 200 may execute the relocation determining module 205 and the relocation executing module 206 for the array group 107 when a user requests relocation.

FIG. 13 is a configuration diagram of a relocation volume list table 305 of a storage management server 114 according to the second embodiment of this invention.

The relocation volume list table 305 includes an original volume ID 305A and a relocation destination array group name 305B.

The original volume ID 305A indicates an identifier unique to the logical volume 108 that stores data to be relocated. In other words, the original volume ID 305A indicates an identifier unique to the logical volume 108 from which data is to be relocated.

The relocation destination array group name 305B indicates an identifier unique to the array group 107 to which the data from the logical volume 108 identified by the original volume ID 305A is moved. In other words, the relocation destination array group 305B indicates an identifier unique to the relocation destination array group 107 to which data is to be relocated.

FIGS. 14A, 14B, 14C and 14D are flow charts for the relocation determining module 205 and the relocation executing module 206, which are provided in the storage management server 114 according to the second embodiment of this invention.

First, the operation management program 200 determines which array group needs data relocation (a to-be-optimized array group) (Step 1301). Specifically, the relocation execution judgment table 306 is searched for a record entry whose threshold 306B or period 306C is exceeded, and extracts the array group name 306A from this record entry. The array group 107 identified by the extracted array group name 306A is set as a to-be-optimized array group.

Next, the operation management program 200 judges whether or not the used I/O density of the to-be-optimized array group is larger than the optimum I/O density (Step 1302). Specifically, the operation management program 200 chooses, from the array group utilization state table 302, a record entry whose array group name 302A matches the extracted array group name 306A. From the chosen record entry, the optimum I/O density 302E and the used I/O density 302H are extracted. Then, the operation management program 200 judges whether or not the used I/O density 302H extracted is larger than the optimum I/O density 302E extracted.

Judging that the used I/O density 302H is larger than the optimum I/O density 302E, the operation management program 200 selects an array group to which data from the to-be-optimized array group is moved (relocation destination array group). Specifically, the operation management program 200 chooses, from the array group utilization state table 302, a record entry whose used I/O density 302H is smaller than the optimum I/O density 302E. In the case where more than one record entry meets the condition, one is chosen from those record entries. For example, one having the largest difference between the used I/O density 302H and the optimum I/O density 302E is chosen out of the record entries that meet the condition.

Next, from the chosen record entry, the array group name 302A is extracted. The array group identified by the extracted array group name 302A is set as a relocation destination array group (Step 1303).

The operation management program 200 next compares the optimum I/O density of the to-be-optimized array group with the optimum I/O density of the relocation destination array group, and sets the larger one of the two as a reference optimum I/O density (Step 1304).

From the logical volumes 108 that belong to the to-be-optimized array group, those having a larger used I/O density than the reference I/O density are selected. From the selected logical volumes 108, those that are already set as candidate volumes from which data is to be relocated are screened out. The logical volumes 108 remaining after the screening are set as candidate volumes from which data is to be relocated (Step 1305).

Specifically, the operation management program 200 selects, from the volume utilization state table 301, record entries whose assigned array group name 301B matches the array group name of the to-be-optimized array group. Out of the selected record entries of the volume utilization state table 301, the operation management program 200 selects those that have a larger used I/O density 301E than the reference optimum I/O density. Then the volume ID 301A is extracted from each chosen record entry. Every logical volume 108 that has the extracted volume ID 301A is checked to screen out the logical volumes 108 that are already set as candidate volumes from which data is to be relocated. The logical volumes 108 remaining after the screening are set as candidate volumes from which data is to be relocated.

The operation management program 200 next judges whether any choosable candidate volume is found in the step S1305 or not (Step 1306). In the case where every logical volume 108 that belongs to the to-be-optimized array group has already been set as a candidate volume from which data is to be relocated, it is judged that no choosable candidate volume is found.

In the case where there is no choosable candidate volume, the processing moves straight to Step 1318.

On the other hand, when there is a choosable candidate volume, the operation management program 200 judges whether or not executing the relocation executing module 206 can make the used I/O densities of the to-be-optimized array group and of the relocation destination array group closer to their respective optimum I/O densities (Step 1307).

Specifically, the operation management program 200 judges whether or not moving data from the candidate volume to the relocation destination array group makes the used I/O densities of the to-be-optimized array group and of the relocation destination array group closer to their respective optimum I/O densities.

When it is judged that the relocation does not make the used I/O densities closer to the optimum I/O densities, the processing returns to the step S1305, where a candidate volume is selected anew.

On the other hand, when it is judged that the relocation makes the used I/O densities closer to the optimum I/O densities, the array group utilization state table 302 is updated to a state after the relocation executing module 206 is executed (Step 1308).

Specifically, the operation management program 200 chooses, from the volume utilization state table 301, a record entry whose volume ID 301A matches the volume ID of the candidate volume from which data is to be relocated. From the chosen record entry, the used I/O amount 301C and the capacity 301D are extracted.

The operation management program 200 next chooses, from the array group utilization state table 302, a record entry whose array group name 302A matches the array group name of the to-be-optimized array group. From the used I/O amount 302F of the chosen record entry, the operation management program 200 subtracts the used I/O amount 301C extracted from the volume utilization state table 301. From the used capacity 302G of the chosen record entry, the operation management program 200 subtracts the capacity 301D extracted from the volume utilization state table 301. Thereafter, the used I/O amount 302F of the chosen record entry is divided by the used capacity 302G of the chosen record entry. The quotient is entered as the used I/O density 302H.

The operation management program 200 next adds, to the free I/O amount 302I of the chosen record entry, the used I/O amount 301C extracted from the volume utilization state table 301. To the free capacity 302J of the chosen record entry, the operation management program 200 adds the capacity 301D extracted from the volume utilization state table 301. Thereafter, the free I/O amount 302I of the chosen record entry is divided by the free capacity 302J of the chosen record entry. The quotient is entered as the free I/O density 302K of the chosen record entry.

The operation management program 200 next chooses, from the array group utilization state table 302, a record entry whose array group name 302A matches the array group name of the relocation destination array group. To the used I/O amount 302F of the chosen record entry, the operation management program 200 adds the used I/O amount 301C extracted from the volume utilization state table 301. To the used capacity 302G of the chosen record entry, the operation management program 200 adds the capacity 301D extracted from the volume utilization state table 301. Thereafter, the used I/O amount 302F of the chosen record entry is divided by the used capacity 302G of the chosen record entry. The quotient is entered as the used I/O density 302H.

The operation management program 200 next subtracts, from the free I/O amount 302I of the chosen record entry, the used I/O amount 301C extracted from the volume utilization state table 301. From the free capacity 302J of the chosen record entry, the operation management program 200 subtracts the capacity 301D extracted from the volume utilization state table 301. Thereafter, the free I/O amount 302I of the chosen record entry is divided by the free capacity 302J of the chosen record entry. The quotient is entered as the free I/O density 302K of the chosen record entry.

The operation management program 200 then adds a new record entry to the relocation volume list table 305. The volume ID of the candidate volume selected in the step S1305 is entered as the original volume ID 305A of the added record entry. The array group name of the relocation destination array group selected in the step S1303 is entered as the relocation destination array group name 305B of the added record entry (Step 1309).

Next, the operation management program 200 judges whether to end the processing (Step 1317). Details of the processing end judging will be described with reference to FIG. 15.

Judging that the relocation determining module 205 should not be ended yet, the operation management program 200 returns to the step S1303 to execute this processing again.

On the other hand, when it is judged that the relocation determining module 205 should be ended, the relocation executing module 206 is executed based on the relocation volume list table 305 (Step 1318).

Specifically, data in the logical volume 108 having the original volume ID 305A of the relocation volume list table 305 is moved to one of the logical volumes 108 that belong to the array group having the relocation destination array group name 305B of the relocation volume list table 305.

Then the processing is ended.

When it is judged in the step S1302 that the used I/O density 302H is equal to or smaller than the optimum I/O density 302E, the operation management program 200 chooses an array group to which data in the to-be-optimized array group is moved (a relocation destination array group). Specifically, the array group utilization state table 302 is searched for record entries whose used I/O density 302H is larger than the optimum I/O density 302E. In the case where more than one record entry meets the condition, one is chosen from those record entries. For example, one having the largest difference between the used I/O density 302H and the optimum I/O density 302E is chosen out of the record entries that meet the condition.

From the chosen record entry, the array group name 302A is extracted. The array group identified by the extracted array group name 302A is set as a relocation destination array group (Step 1310).

The operation management program 200 next compares the optimum I/O density of the to-be-optimized array group with the optimum I/O density of the relocation destination array group, and sets the smaller one of the two as a reference optimum I/O density (Step 1311).

From the logical volumes 108 that belong to the to-be-optimized array group, those having a smaller used I/O density than the reference I/O density are selected. From the selected logical volumes 108, those that are already set as candidate volumes from which data is to be relocated are screened out. The logical volumes 108 remaining after the screening are set as candidate volumes from which data is to be relocated (Step 1312).

Specifically, the operation management program 200 selects, from the volume utilization state table 301, record entries whose assigned array group name 301B matches the array group name of the to-be-optimized array group. Out of the selected record entries of the volume utilization state table 301, the operation management program 200 selects those that have a smaller used I/O density 301E than the reference optimum I/O density. Then the volume ID 301A is extracted from each chosen record entry. Every logical volume 108 that has the extracted volume ID 301A is checked to screen out the logical volumes 108 that are already set as candidate volumes from which data is to be relocated. The logical volumes 108 remaining after the screening are set as candidate volumes from which data is to be relocated.

The operation management program 200 next judges whether any choosable candidate volume is found in the step S1312 or not (Step 1313). In the case where every logical volume 108 that belongs to the to-be-optimized array group has already been set as a candidate volume from which data is to be relocated, it is judged that no choosable candidate volume is found.

In the case where there is no choosable candidate volume, the processing moves straight to the step S1318.

On the other hand, when there is a choosable candidate volume, the operation management program 200 judges whether or not executing the relocation executing module 206 can make the used I/O densities of the to-be-optimized array group and of the relocation destination array group closer to their respective optimum I/O densities (Step 1314).

Specifically, the operation management program 200 judges whether or not moving data from the candidate volume to the relocation destination array group makes the used I/O densities of the to-be-optimized array group and of the relocation destination array group closer to their respective optimum I/O densities.

When it is judged that the relocation does not make the used I/O densities closer to the optimum I/O densities, the processing returns to the step S1310, where a candidate volume is selected anew.

On the other hand, when it is judged that the relocation makes the used I/O densities closer to the optimum I/O densities, the array group utilization state table 302 is updated to a state after the relocation executing module 206 is executed (Step 1315).

Specifically, the operation management program 200 chooses, from the volume utilization state table 301, a record entry whose volume ID 301A matches the volume ID of the candidate volume from which data is to be relocated. From the chosen record entry, the used I/O amount 301C and the capacity 301D are extracted.

The operation management program 200 next chooses, from the array group utilization state table 302, a record entry whose array group name 302A matches the array group name of the to-be-optimized array group. From the used I/O amount 302F of the chosen record entry, the operation management program 200 subtracts the used I/O amount 301C extracted from the volume utilization state table 301. From the used capacity 302G of the chosen record entry, the operation management program 200 subtracts the capacity 301D extracted from the volume utilization state table 301. Thereafter, the used I/O amount 302F of the chosen record entry is divided by the used capacity 302G of the chosen record entry. The quotient is entered as the used I/O density 302H.

The operation management program 200 next adds, to the free I/O amount 302I of the chosen record entry, the used I/O amount 301C extracted from the volume utilization state table 301. To the free capacity 302J of the chosen record entry, the operation management program 200 adds the capacity 301D extracted from the volume utilization state table 301. Thereafter, the free I/O amount 302I of the chosen record entry is divided by the free capacity 302J of the chosen record entry. The quotient is entered as the free I/O density 302K of the chosen record entry.

The operation management program 200 next chooses, from the array group utilization state table 302, a record entry whose array group name 302A matches the array group name of the relocation destination array group. To the used I/O amount 302F of the chosen record entry, the operation management program 200 adds the used I/O amount 301C extracted from the volume utilization state table 301. To the used capacity 302G of the chosen record entry, the operation management program 200 adds the capacity 301D extracted from the volume utilization state table 301. Thereafter, the used I/O amount 302F of the chosen record entry is divided by the used capacity 302G of the chosen record entry. The quotient is entered as the used I/O density 302H.

The operation management program 200 next subtracts, from the free I/O amount 302I of the chosen record entry, the used I/O amount 301C extracted from the volume utilization state table 301. From the free capacity 302J of the chosen record entry, the operation management program 200 subtracts the capacity 301D extracted from the volume utilization state table 301. Thereafter, the free I/O amount 302I of the chosen record entry is divided by the free capacity 302J of the chosen record entry. The quotient is entered as the free I/O density 302K of the chosen record entry.

The operation management program 200 then adds a new record entry to the relocation volume list table 305. The volume ID of the candidate volume selected in the step S1312 is entered as the original volume ID 305A of the added record entry. The array group name of the relocation destination array group selected in the step S1303 is entered as the relocation destination array group name 305B of the added record entry (Step 1316).

Next, the operation management program 200 judges whether to end the processing (Step 1317). Details of the processing end judging will be described with reference to FIG. 15.

Judging that the relocation determining module 205 should not be ended yet, the operation management program 200 returns to the step S1310 to execute this processing again.

On the other hand, when it is judged that the relocation determining module 205 should be ended, the relocation executing module 206 is executed based on the relocation volume list table 305 (the step S1318). Specifically, data in the logical volume 108 having the original volume ID 305A of the relocation volume list table 305 is moved to one of the logical volumes 108 that belong to the array group having the relocation destination array group name 305B of the relocation volume list table 305.

Then the processing is ended.

Figure 15:
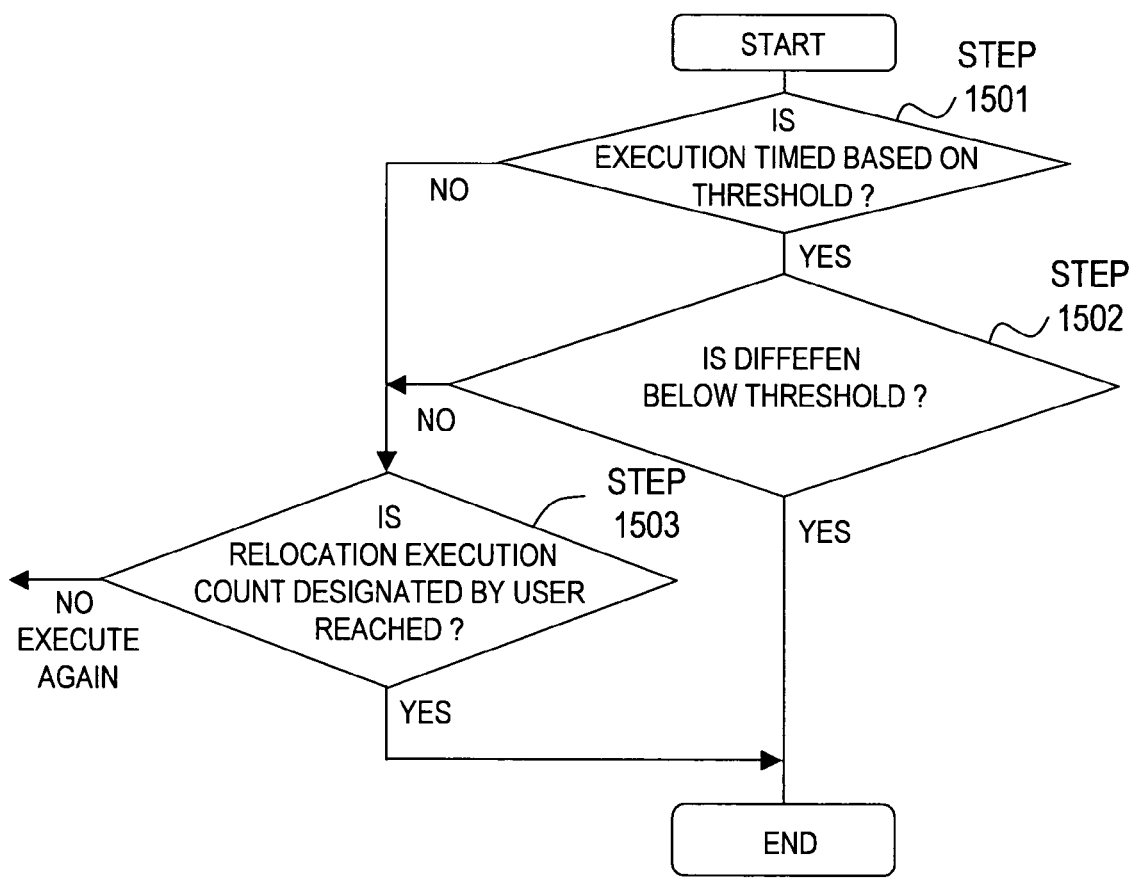
FIG. 15 is a flow chart for processing executed by the storage management server according to the second embodiment of this invention to judge whether to end processing.
Figure 16A:
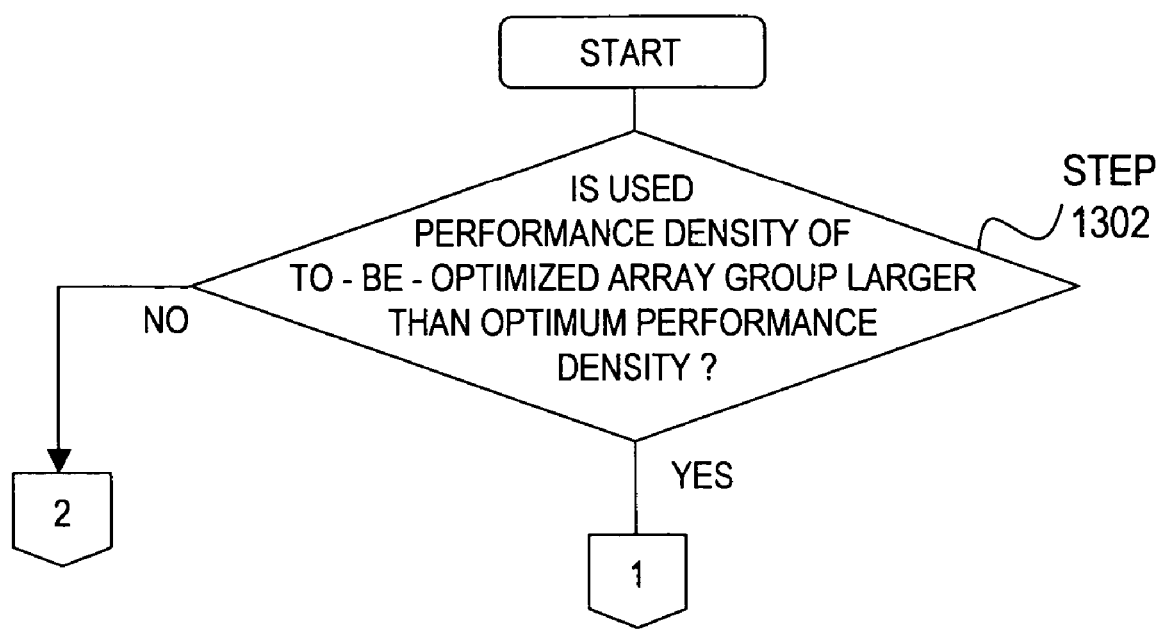
FIG. 16A is a flow chart for a relocation determining module and a relocation executing module, which are provided in a storage management server according to a third embodiment of this invention.
Figure 16B:
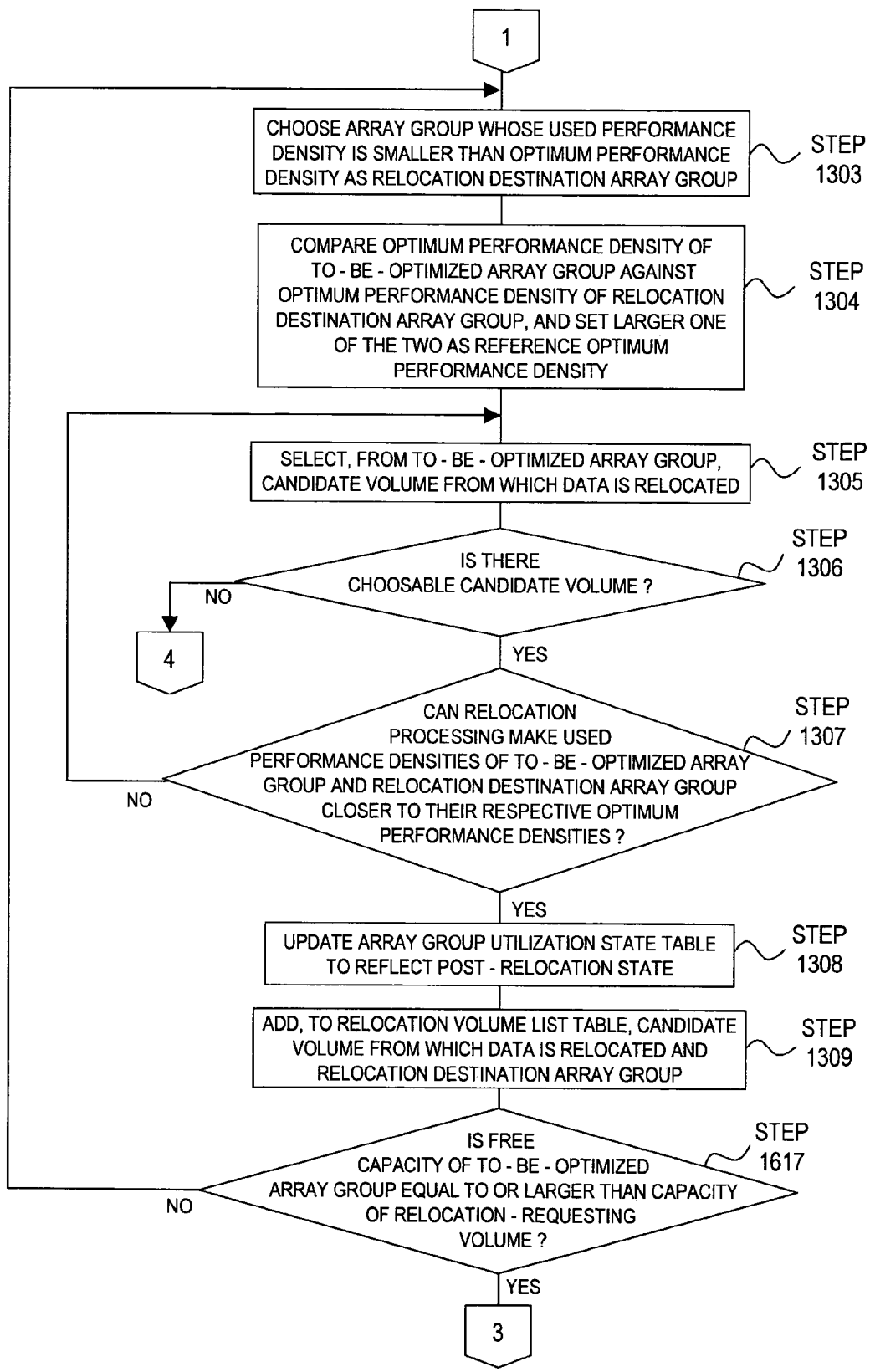
FIG. 16B is a flow chart for the relocation determining module and the relocation executing module, which are provided in the storage management server according to the third embodiment of this invention.
Figure 16C:
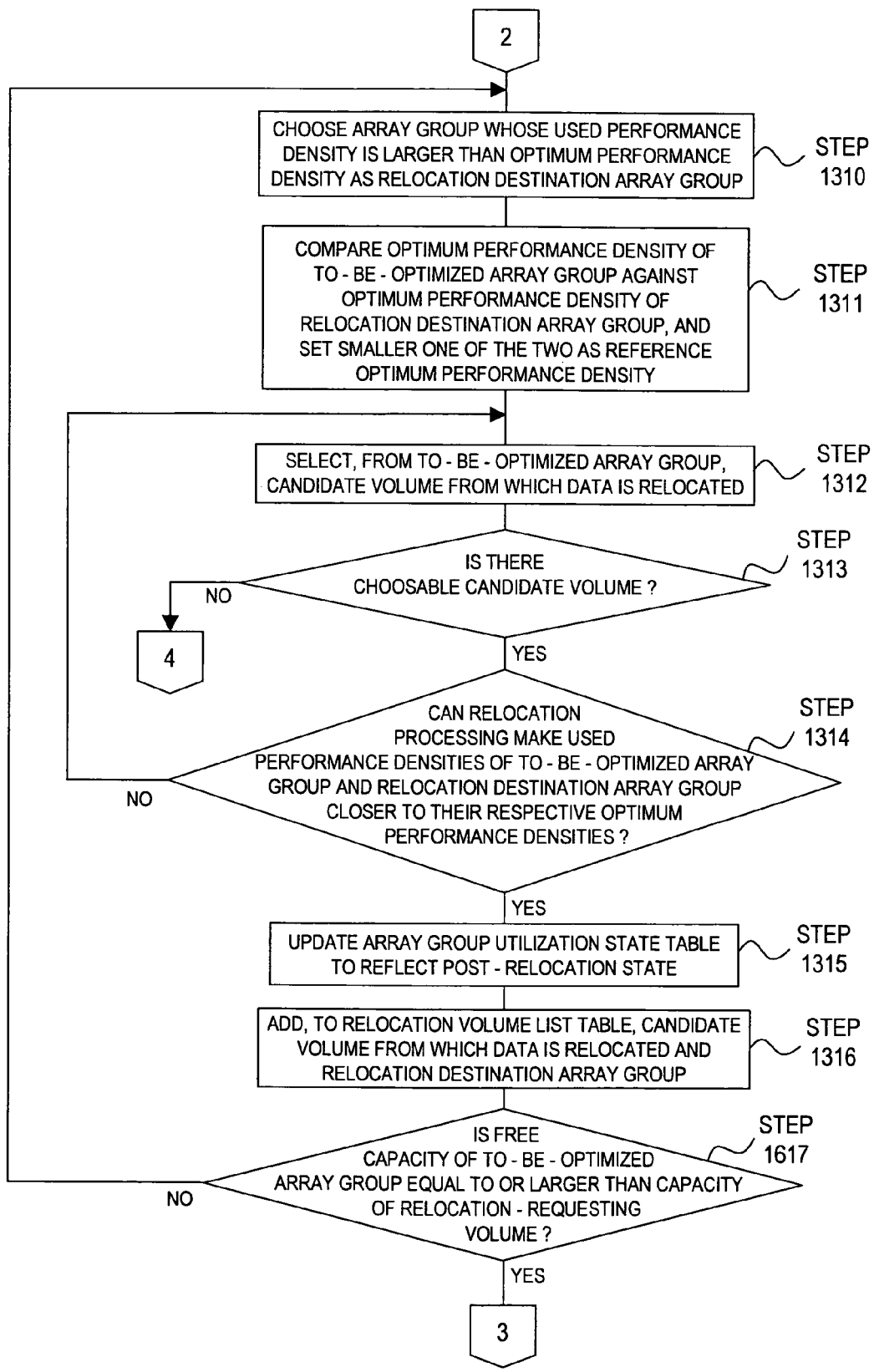
FIG. 16C is a flow chart for the relocation determining module and the relocation executing module, which are provided in the storage management server according to the third embodiment of this invention.
Figure 16D:
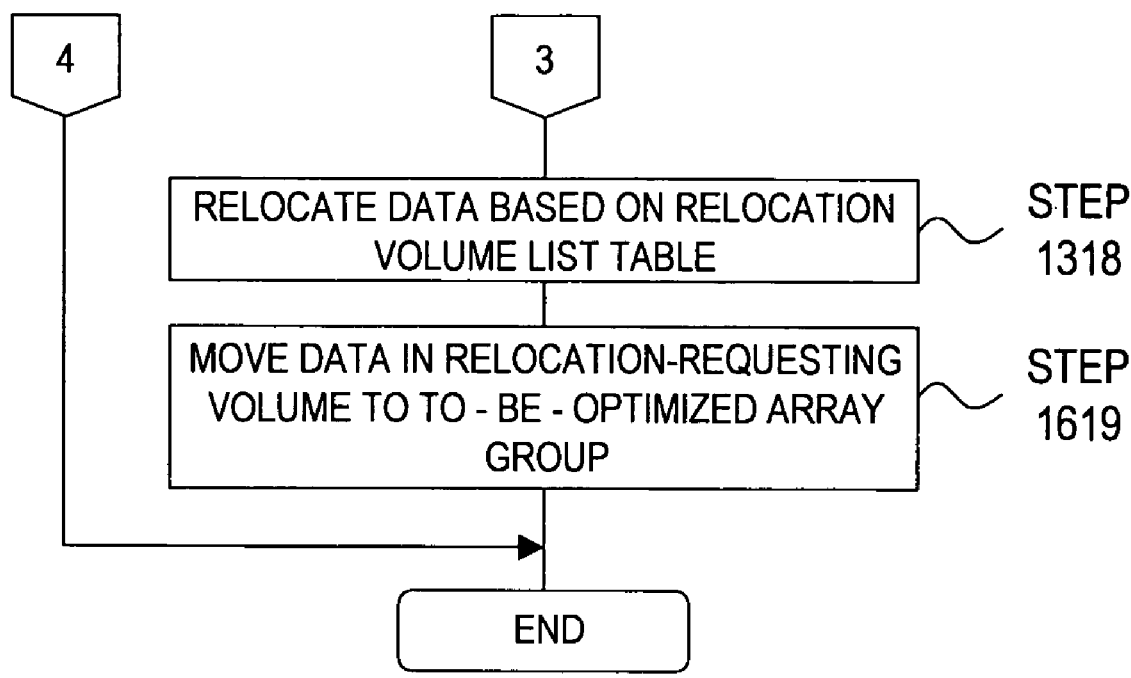
FIG. 16D is a flow chart for the relocation determining module and the relocation executing module, which are provided in the storage management server according to the third embodiment of this invention.

FIG. 15 is a flow chart for processing executed by a storage management server 114 according to the second embodiment of this invention to judge whether to end processing.

Figure 14A:
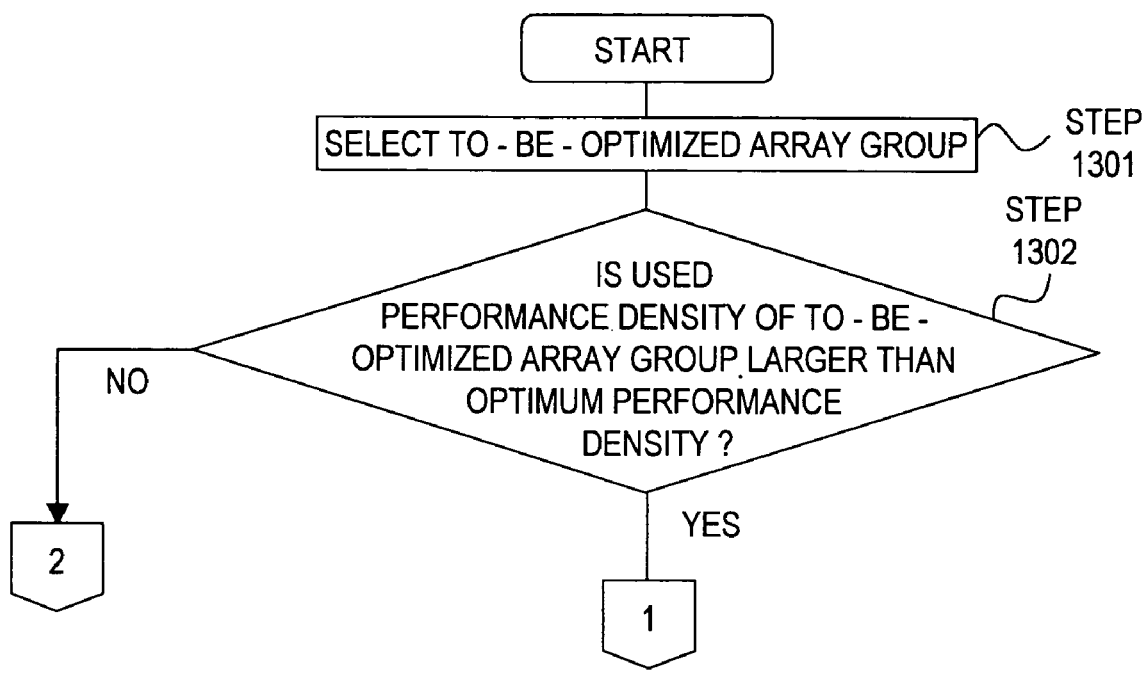
FIG. 14A is a flow chart for a relocation determining module and a relocation executing module, which are provided in the storage management server according to the second embodiment of this invention.
Figure 14B:
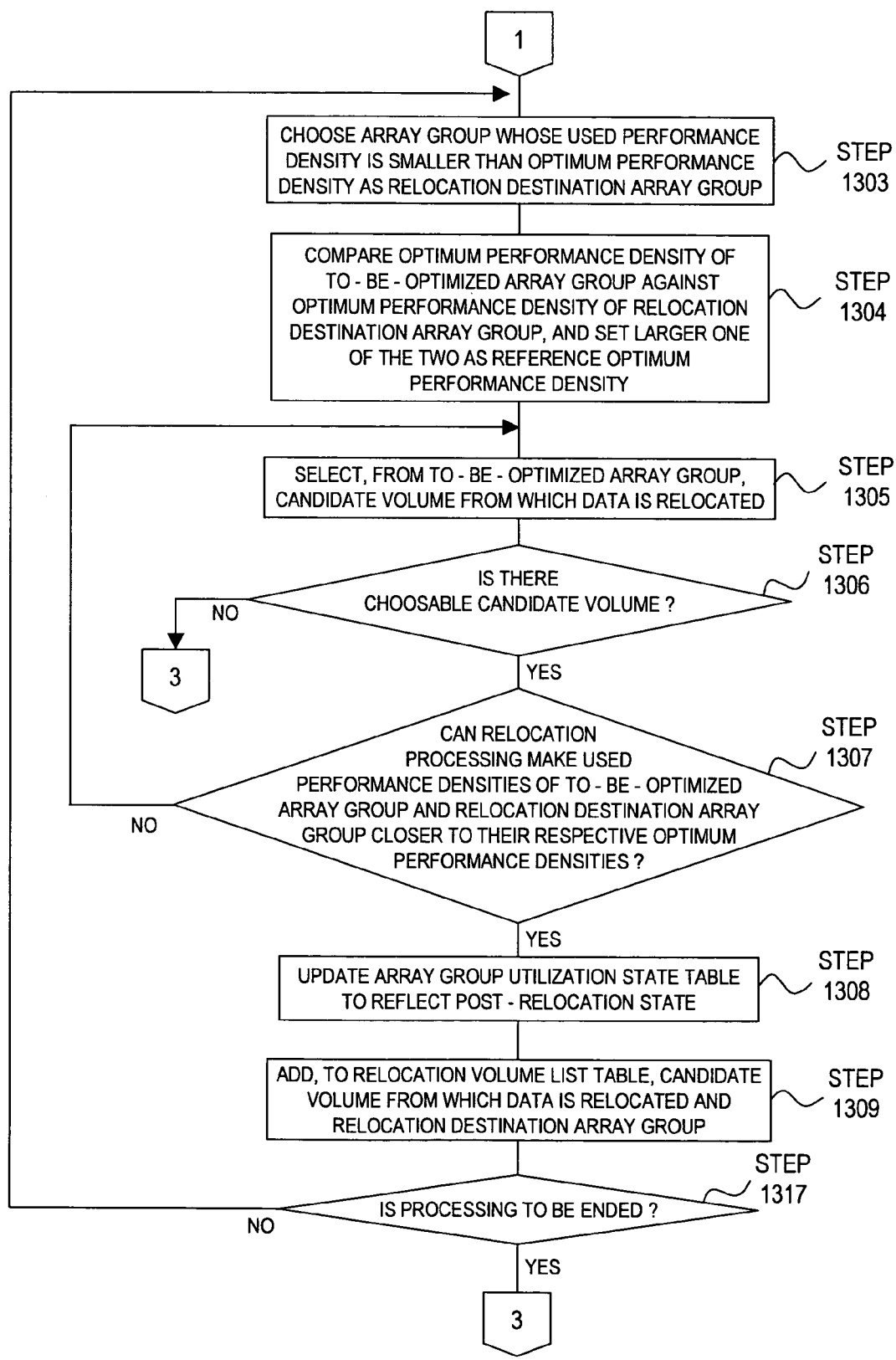
FIG. 14B is a flow chart for the relocation determining module and the relocation executing module, which are provided in the storage management server according to the second embodiment of this invention.
Figure 14C:
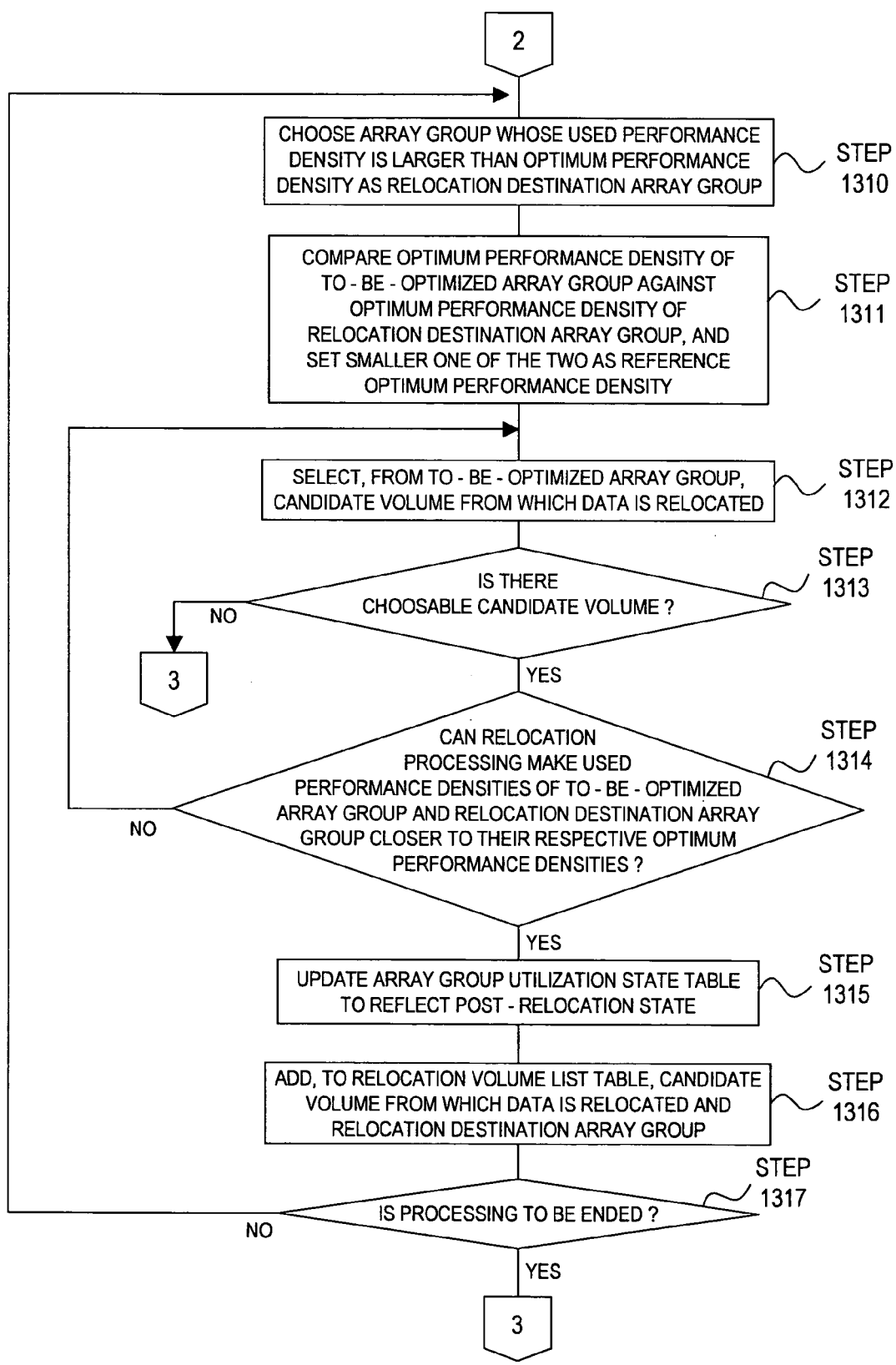
FIG. 14C is a flow chart for the relocation determining module and the relocation executing module, which are provided in the storage management server according to the second embodiment of this invention.
Figure 14D:
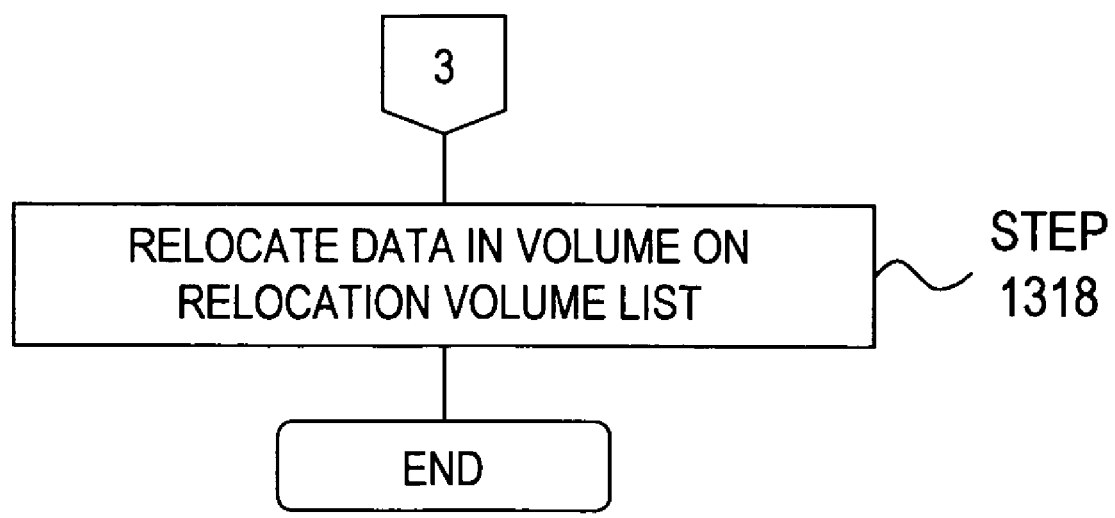
FIG. 14D is a flow chart for the relocation determining module and the relocation executing module, which are provided in the storage management server according to the second embodiment of this invention.

The processing of judging whether to end the processing is executed in the step S1317 by the relocation determining module of the storage management server 114 which is shown in FIGS. 14B and 14C.

First, the operation management program 200 judges whether or not execution of the relocation determining module 205 is timed based on the threshold 306B of the relocation execution judgment table 306. In other words, the operation management program 200 judges whether or not the difference between the used I/O density and the optimum I/O density exceeding the threshold 306B of the relocation execution judgment table 306 is the cause of executing the relocation determining module 205 (Step 1501).

In the case where execution of the relocation determining module 205 is not timed based on the threshold 306B, the processing moves to Step 1503.

On the other hand, in the case where execution of the relocation determining module 205 is timed based on the threshold 306B, the operation management program 200 judges whether or not the difference between the used I/O density and the optimum I/O density of the to-be-optimized array group is below the threshold 306B (Step 1502).

Specifically, the operation management program 200 chooses, from the array group utilization state table 302, a record entry whose array group name 302A matches the array group name of the to-be-optimized array group. From the chosen record entry, the optimum I/O density 302E and the used I/O density 302H are extracted. The operation management program 200 next chooses, from the relocation execution judgment table 306, a record entry whose array group name 306A matches the array group name of the to-be-optimized array group. From the chosen record entry, the threshold 306B is extracted. Then the operation management program 200 judges whether or not the difference between the extracted optimum I/O density 302E and the used I/O density 302H is smaller than the extracted threshold 306B.

When the difference is smaller than the threshold 306B, it is judged that the relocation determining module 205 should be ended. Then the relocation executing module 206 takes over and performs the processing of the step S1319 shown in FIG. 14D.

The processing moves to Step 1503 from the step S1501 in the case where execution of the relocation determining module 205 is not timed based on the threshold 306B in the step S1501, or from the step S1502 in the case where the difference is equal to or larger than the threshold 306B.

In the step S1503, the operation management program 200 judges whether or not the number of times the relocation executing module 206 has been executed reaches a requested execution count, which is specified by the user. Specifically, the operation management program 200 judges whether or not the number of candidate volumes selected in the step S1305 of FIG. 14B or in the step S1312 of FIG. 14C is equal to or larger than the requested execution count specified by the user.

When the number of times the relocation executing module 206 has been executed is short of the requested execution count, the relocation determining module 205 is repeated. To repeat the relocation determining module 205, the processing returns to the step S1303 of FIG. 14B or the step S1310 of FIG. 14C.

When the number of times the relocation executing module 206 has been executed is equal to or larger than the requested execution count, it is judged that the relocation determining module 205 should be ended. Then the relocation executing module 206 takes over and performs the processing of the step S1319 shown in FIG. 14D.

In this embodiment, the operation management program 200 makes the used I/O density closer to the optimum I/O density by moving data from the to-be-optimized array group 107 to another array group 107.

Alternatively, the operation management program 200 may make the used I/O density closer to the optimum I/O density by moving data to the to-be-optimized array group 107 from another array group 107. Specifically, the operation management program 200 moves data from the data's original array group 107 (an original array group from which data is to be located) to one of the logical volumes 108 that belong to the to-be-optimized array group 107 (a relocation destination logical volume).

The relocation determining module 205 of the operation management program 200 in this case works differently in the steps S1303 to S1305 of FIG. 14B and in the steps S1310 to S1312 of FIG. 14C. The different processing is described below.

In the step S1303, the operation management program 200 sets the array group 107 that has a used I/O density smaller than its optimum I/O density as the original array group from which data is to be relocated.

In the step S1304, the optimum. I/O density of the to-be-optimized array group is compared with the used I/O density of the original array group, and the smaller one of the two is set as a reference optimum density.

In the step S1305, from the logical volumes 108 that belong to the to-be-optimized array group, those having a smaller used I/O density than the reference I/O density are selected. From the selected logical volumes 108, those that are already set as relocation destination candidate volumes are screened out. The logical volumes 108 remaining after the screening are set as relocation destination candidate volumes.

The subsequent processing is the same as above, and therefore will not be described.

In the step S1310, the operation management program 200 sets the array group 107 that has a used I/O density larger than its optimum I/O density as the original array group from which data is to be relocated.

In the step S1311, the optimum I/O density of the to-be-optimized array group is compared with the used I/O density of the original array group, and the larger one of the two is set as a reference optimum density.

In the step S1312, from the logical volumes 108 that belong to the to-be-optimized array group, those having a larger used I/O density than the reference I/O density are selected. From the selected logical volumes 108, those that are already set as relocation destination candidate volumes are screened out. The logical volumes 108 remaining after the screening are set as relocation destination candidate volumes.

The subsequent processing is the same as above, and therefore will not be described.

The operation management program 200 can thus move data from the data's original array group to a relocation destination volume that belongs to the to-be-optimized array group.

This enables the operation management program 200 to optimize the array group 107 even when the array group 107 to be optimized has a small used capacity or when there is no suitable data for relocation in the array group 107 to be optimized.

The operation management program 200 may combine the mode in which data is moved from the to-be-optimized array group 107 to another array group 107 and the mode in which data is moved to the to-be-optimized array group 107 from another array group 107. Therefore the operation management program 200 can perform flexible optimization.

The operation management program 200 may have a user specify what type of array group 107 can serve as a relocation destination. For instance, a user designates, in advance, some array groups 107 as possible relocation destination array groups. From among the designated array groups 107, the operation management program 200 chooses a relocation destination array group.

Third Embodiment

A computer system of a third embodiment executes optimization of a to-be-optimized array group when data cannot be moved from the logical volume 108 designated by a user to the to-be-optimized array group.

The computer system of the third embodiment has the same configuration as the computer system of the second embodiment shown in FIG. 1, and a description on the configuration is omitted. The storage management server 114 of the third embodiment has the same configuration as the storage management server of the second embodiment shown in FIG. 11, and therefore will not be described here.

FIGS. 16A, 16B, 16C, and 16D are flow charts for the relocation determining module 205 and the relocation executing module 206, which are provided in the storage management server 114 according to the third embodiment of this invention.

First, a user request the storage management server 114 to relocate data, specifying which array group is to be optimized (to-be-optimized array group). At this point, the user designates the logical volume 108 where data to be moved to the to-be-optimized array group is stored (relocation-requesting volume).

The operation management program 200 attempts to optimize the to-be-optimized array group by moving data from the relocation-requesting volume designated by the user to the to-be-optimized array group. The to-be-optimized array group happens to be short of free storage area, and currently has no space to store data sent from the relocation-requesting volume. In short, the operation management program 200 cannot move data from the relocation-requesting volume to the to-be-optimized array group.

In such cases, the operation management program 200 executes the relocation determining module 205 according to the third embodiment.

The relocation determining module 205 of the third embodiment is the same as the relocation determining module of the second embodiment shown in FIGS. 14A to 14D, except for several steps. The steps common to the second and third embodiments are denoted by the same reference symbols, and descriptions thereof will be omitted.

The operation management program 200 judges whether or not any choosable candidate volume from which data is to be relocated is found in the step S1305 (the step S1306). When there is no choosable candidate volume from which data is to be relocated, the to-be-optimized array group cannot be optimized and the processing is terminated.

Similarly, the operation management program 200 judges whether or not any choosable candidate volume is found in the step S1312 (the step S1313). When there is no choosable candidate volume from which data is to be relocated, the to-be-optimized array group cannot be optimized and the processing is terminated.

Instead of the end judging processing of the step S1317, the operation management program 200 judges whether or not data in the relocation-requesting volume can be moved to the to-be-optimized array group.

Specifically, the operation management program 200 chooses, from the array group utilization state table 302, a record entry whose array group name 302A matches the array group name of the to-be-optimized array group. From the chosen record entry, the free capacity 302J is extracted. The operation management program 200 then chooses, from the volume utilization state table 301, a record entry whose volume ID 301A matches the volume ID of the relocation-requesting volume. From the chosen record entry, the capacity 301D is extracted. The operation management program 200 judges whether or not the extracted free capacity 302J is equal to or larger than the extracted capacity 301D (Step 1617).

When the free capacity 302J is smaller than the capacity 301D, the processing returns to the step S1303 or S1310 in order to increase the free capacity 302J of the to-be-optimized array group.

When the free capacity 302J is equal to or larger than the capacity 301D, data can be moved from the relocation-requesting volume to the to-be-optimized array group. Then the operation management program 200 executes the relocation executing module 206 based on the relocation volume list table 305 (the step S1318). Specifically, data in the logical volume 108 that has the original volume ID 305A of the relocation volume list table 305 is moved to the logical volume 108 that belongs to the array group 107 identified by the relocation destination array group name 305B of the relocation volume list table 305. A free area is thus created in the to-be-optimized array group.

Then data in the relocation-requesting volume is moved to the to-be-optimized array group (Step 1619), and the processing is ended.

The storage management server 114 of this embodiment can optimize a to-be-optimized array group even when data in the logical volume 108 designated by a user cannot be moved to the to-be-optimized array group.

Fourth Embodiment

A computer system according to a fourth embodiment relocates data in a manner that gives a uniform I/O density to every array group 107.

The computer system of the fourth embodiment has the same configuration as the computer system of the second embodiment shown in FIG. 1, and a description on the configuration is omitted. The storage management server 114 of the fourth embodiment has the same configuration as the storage management server of the second embodiment shown in FIG. 11, and therefore will not be described here.

The computer system of the fourth embodiment is applicable as the computer system of the second embodiment or the third embodiment.

The storage management server 114 in the second and third embodiments relocate data in a manner that makes the used I/O density closer to the optimum I/O density. In the fourth embodiment, the storage management server 114 relocates data in a manner that makes the used I/O density closer to a mean used I/O density, which is obtained by averaging the used I/O densities of all the array groups 107.

Specifically, the storage management server 114 of the fourth embodiment uses, in every processing, the mean used I/O density instead of the optimum I/O density. The rest is the same as the processing performed by the storage management server 114 in the second and third embodiments, and therefore will not be described here.

The storage management server 114 in the second and third embodiments cannot optimize any array group 107 when every array group 107 has a used I/O density larger than its optimum I/O density. Similarly, the storage management server 114 in the second and third embodiments cannot optimize any array group 107 when every array group has a used I/O density smaller than its optimum I/O density.

In the fourth embodiment, those cases do not prevent the storage management server 114 from optimizing the array group 107.

The operation management program 200 may have a user choose which of optimum I/O density and mean used I/O density is employed. Therefore the operation management program 200 can execute flexible optimization.

Fifth Embodiment

The storage management server 114 according to a fifth embodiment determines an order of priority based on the used I/O density after data relocation.

A computer system of the fifth embodiment has the same configuration as the computer system of the first embodiment shown in FIG. 1, and a description on the configuration is omitted. The storage management server 114 of the fifth embodiment has the same configuration as the storage management server of the first embodiment shown in FIG. 2, and therefore will not be described here.

Figure 17:
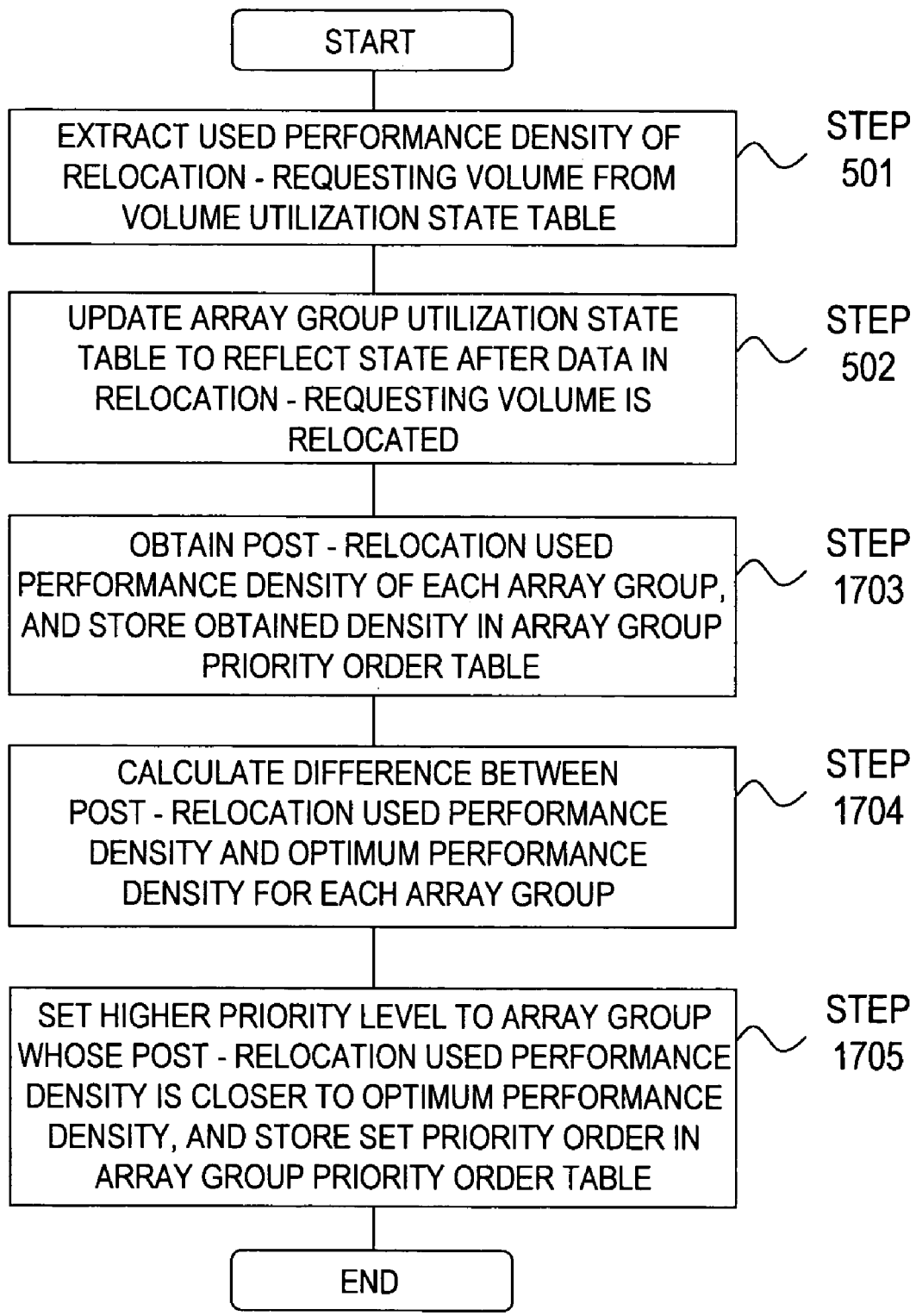
FIG. 17 is a flow chart for a relocation destination array group determining module of a storage management server according to a fifth embodiment of this invention.

FIG. 17 is a flow chart for the relocation destination array group determining module 202 of the storage management server 114 according to the fifth embodiment of this invention.

First, the operation management program 200 executes the steps S501 and S502. Processing of the steps S501 and 502 in this embodiment is the same as the processing of the relocation destination array group determining module of the first embodiment shown in FIG. 8. Therefore, the description will not be repeated.

The operation management program 200 updates the array group utilization state table 302, and then creates the array group priority order table 303 about the relocation-requesting volume as shown in FIG. 6. In the array group priority order table 303 created, a value is entered as the post-relocation used I/O density 303C (Step 1703).

Specifically, record entries of the array group utilization state table 302 are chosen one by one starting from the top and proceeding downward. From each chosen record entry, the used I/O amount 302F, the used capacity 302G, and the used I/O density 302H are extracted. The used I/O amount 301C extracted from the volume utilization state table 301 in the step S502 is added to the used I/O amount 302F extracted. Thus calculated is a used I/O amount of when data relocation to this array group 107 is completed. To the used capacity 302G extracted, the operation management program 200 adds the capacity 301D extracted from the volume utilization state table 301 in the step S502. Thus calculated is a used capacity of when data relocation to this array group 107 is completed.

The calculated used I/O amount is divided by the calculated used capacity, thereby obtaining a used I/O density of when data relocation to this array group 107 is completed. The calculated used I/O density is entered as the post-relocation used I/O density 303C in the array group priority order table 303.

The operation management program 200 then calculates the difference between the post-relocation used I/O density 303C entered and the used I/O density 302H extracted from the array group utilization state table 302. Thus calculated is how much the used I/O density is changed by data relocation to the array group 107. The calculated amount of change is entered in a field for the amount of change of the used I/O density 303C in the array group priority order table 303.

In this fashion, all record entries of the array group utilization state table 302 are sequentially chosen to calculate the used I/O density of when data relocation to the array group 107 in question is completed and how much the used I/O density is changed by the data relocation. The calculated used I/O density and the calculated amount of change of the used I/O density are stored as the post-relocation used I/O density 303C in the array group priority order table 303 (the step S1703).

Next, record entries of the created array group priority order table 303 are chosen one by one starting from the top and proceeding downward. From each chosen record entry, the array group name 303A and the post-relocation used I/O density 303C are extracted. The operation management program 200 next chooses, from the array group utilization state table 302, a record entry whose array group name 302A matches the extracted array group name 303A. From the chosen record entry, the optimum I/O density 302E is extracted. The operation management program 200 then calculates the difference between the post-relocation used I/O density 303C extracted and the optimum I/O density 302E extracted.

In this fashion, all record entries of the array group priority order table 303 are sequentially chosen to calculate, for each array group 107, the difference between the post-relocation used I/O density 303C and the optimum I/O density 302E (Step 1704).

The operation management program 200 next sets a priority level to each array group 107. Specifically, a higher priority level is set to the array group 107 whose post-relocation I/O density 303C is closer to the optimum I/O density 302E based on the result of calculating the difference between the post-relocation used I/O density 303C and the optimum I/O density 302E.

The set priority level is entered as the priority level 303B in the array group priority order table 303 (Step 1705).

Then the processing of the relocation destination array group determining module 202 is ended.

The storage management server 114 of this embodiment sets an order of priority based on the used I/O density after data relocation. The array groups 107 are displayed in descending order of priority, so the user can choose the array group 107 that has a higher priority level as a data relocation destination. Through repetition of the process, the storage management server 114 makes the used I/O density of each array group 107 closer to its optimum I/O density. Thus the storage subsystem 105 can make full use of a I/O resource and a capacity resource.

Sixth Embodiment

The storage management server 114 according to a sixth embodiment relocates data based on how much I/O amount a user requests the logical volume 108 to have.

The sixth embodiment is applicable to any of the computer systems of the first to fifth embodiments.

A computer system of the sixth embodiment has the same configuration as the computer system of the first embodiment shown in FIG. 1, and a description on the configuration is omitted. The storage management server 114 of the sixth embodiment has the same configuration as the storage management server of the first embodiment shown in FIG. 2, or the storage management server of the second embodiment shown in FIG. 11, except for the volume utilization state table 301. A description on the storage management server 114 of this embodiment is therefore omitted.

FIG. 18 is a configuration diagram of the volume utilization state table 301 of the storage management server 114 according to the fifth embodiment of this invention.

The volume utilization state table 301 includes the volume ID 301A, the assigned array group name 301B, the used I/O amount 301C, the capacity 301D, the used I/O density 301E, the active/inactive state 301F, a requested I/O amount 301G, and a requested I/O density 301H.

The volume ID 301A, the assigned array group name 301B, the used I/O amount 301C, the capacity 301D, the used I/O density 301E, and the active/inactive state 301F are the same as those in the volume utilization state table of the first embodiment shown in FIG. 3. The common components are denoted by the same reference symbols, and descriptions thereof will be omitted.

The requested I/O amount 301G indicates how much I/O amount is requested by a user for the logical volume 108 identified by the volume ID 301A. The storage subsystem 105 secures a I/O amount indicated by the requested I/O amount 301G for this logical volume 108 within the array group 107.

The requested I/O density 301H indicates the ratio of the requested I/O amount to the capacity of this logical volume 108. Specifically, the requested I/O density 301H is obtained by dividing the requested I/O amount 301G by the capacity 301D.

The storage management server 114 of this embodiment compares the used I/O amount 301C with the requested I/O amount 301G in the case where the used I/O amount 301C of the volume utilization state table 301 is employed in every processing.

When the requested I/O amount 301G is larger than the used I/O amount 301C, the requested I/O amount 301G, instead of the used I/O amount 301C, is employed as the used I/O amount of the logical volume 108 in question. When the requested I/O amount 301G is equal to or smaller than the used I/O amount 301C, the used I/O amount 301C is employed as the used I/O amount of the logical volume 108 in question.

For instance, when obtaining the used I/O amount of one array group 107, the storage management server 114 compares the used I/O amount 301C with the requested I/O amount 301G for each logical volume 108 that belongs to the array group 107. As a result of comparison, the larger one of the used I/O amount 301C and the requested I/O amount 301G is chosen, and its value is extracted for each logical volume 108. The extracted values are added, and the sum is employed as the used I/O amount of this array group 107.

The storage management server 114 of this embodiment can relocate data while securing a I/O amount requested by a user.

Seventh Embodiment

The storage management server 114 according to a seventh embodiment employs, as the used I/O amount, a mean used I/O amount during a given period.

The seventh embodiment is applicable to any of the computer systems of the first to fifth embodiments.

A computer system of the seventh embodiment has the same configuration as the computer system of the first embodiment shown in FIG. 1, and a description on the configuration is omitted. The storage management server 114 of the seventh embodiment has the same configuration as the storage management server of the first embodiment shown in FIG. 2, or the storage management server of the second embodiment shown in FIG. 11, except for the volume utilization state table 301. A description on the storage management server 114 of this embodiment is therefore omitted.

The length of a period in which the used I/O amount is averaged is set in the storage management server 114 by a user. The user may set the same length of a period to a group of logical volumes 108 or to the array group 107.

A difference between this embodiment and the first to fifth embodiments is the utilization state obtaining module 201 of the operation management program 200. Described below is how the utilization state obtaining module 201 of the operation management program 200 works in this embodiment.

The operation management program 200 obtains, at regular sampling intervals, a volume ID and a I/O amount that are stored in the disk controller 106 of each storage subsystem 105.

For each logical volume 108, the operation management program 200 keeps adding up the obtained I/O amount until the period set by the user passes. The operation management program 200 stores the sum of the obtained I/O amount and the obtained volume ID.

Once the period set by the user passes, the operation management program 200 divides the stored sum of I/O amount by the length of this period. Thus, calculated is the mean I/O amount during the period set by the user.

The calculated mean I/O amount is entered as the used I/O amount 301C in the volume utilization state table 301.

As described above, the storage management server 114 of this embodiment employs, as the used I/O amount, a mean used I/O amount during a given period. This enables the storage management server 114 to execute appropriate relocation of data that causes a great change in the amount of a used I/O resource.

While the present invention has been described in detail and pictorially in the accompanying drawings, the present invention is not limited to such detail but covers various obvious modifications and equivalent arrangements, which fall within the purview of the appended claims.

What is claimed is:

1. A computer system comprising:
a storage system;
a host computer connected to the storage system via a network; and
a management computer connected to the storage system,
wherein the storage system comprises a first interface connected to the network, a first processor connected to the first interface, a first memory connected to the first processor, and a disk drive where data written by the host computer is stored,
wherein the host computer comprises a second interface connected to the network, a second processor connected to the second interface, and a second memory connected to the second processor,
wherein the management computer comprises a third interface connected to the storage system, a third processor connected to the third interface, and a third memory connected to the third processor,
wherein the second processor recognizes a storage area of the disk drive on a logical volume basis,
wherein the first processor measures, for each logical volume, a storage capacity of the logical volume and a used I/O amount of the logical volume, which indicates a amount of a I/O resource used by the logical volume, and
wherein the third processor has the following functions:
manages the logical volumes in groups by storing the association relation between the logical volumes and groups in the third memory;
obtains, via the third interface, the used I/O amount of the logical volume and storage capacity of the logical volume measured by the first processor;
designates to a logical volume to which data is to be moved based on a ratio of the obtained used I/O amount of the logical volume to the obtained storage capacity of the logical volume; and
instructs, via the third interface, the first processor to move data from the data's original logical volume to the logical volume designated as the destination of migration.

2. The computer system according to claim 1, wherein the third processor:
calculates, from the obtained used I/O amount of the logical volume, a free I/O amount of the group, which indicates a amount of a I/O resource unused by the group;
calculates, from the obtained storage capacity of the logical volume, a free storage capacity of the group, which indicates a storage capacity unused by the group; and
compares a ratio of the calculated free I/O amount of the group to the calculated free storage capacity of the group against the ratio of the obtained used I/O amount of the logical volume to the obtained storage capacity of the logical volume, and thereby designating a logical volume to which data is to be moved.

3. The computer system according to claim 1, wherein the third processor:
stores, in the third memory, a usable I/O amount of the group, which indicates a limit in usage of a I/O resource of the group;
calculates, from the obtained storage capacity of the logical volume, a used storage capacity of the group, which indicates a storage capacity used by the group;
compares a ratio of the stored usable I/O amount of the group to the calculated used storage capacity of the group against the ratio of the obtained used I/O amount of the logical volume to the obtained storage capacity of the logical volume, and thereby designating a logical volume to which data is to be moved.

4. The computer system according to claim 1,
wherein the management computer comprises a display unit on which information is displayed, and
wherein the third processor:
sets a priority level, which indicates a degree of suitableness as a logical volume to which data is to be moved, to a logical volume based on the ratio of the obtained used I/O amount of the logical volume to the obtained storage capacity of the logical volume; and
causes the display unit displaying identifiers of the logical volumes in descending order of priority so that a logical volume set to the highest priority level is displayed at the top.

5. The computer system according to claim 1, wherein the third processor:

stores, in the third memory, relocation execution judgment information, which indicates when to perform processing of moving data between logical volumes; and instructs, at timing that is determined by the relocation execution judgment information stored in the third memory, via the third interface, the first processor to move data from the data's original logical volume to the logical volume designating as the destination of migration.

6. The computer system according to claim 1, wherein, in the case where a request to move data to a designated group is received but the designated group does not have a logical volume to which the data is moved, the third processor:

designates a logical volume as a migration destination of data in a logical volume that belongs to the designated group based on the ratio of the obtained used I/O amount of the logical volume to the obtained storage capacity of the logical volume; and secures a storage area for the designated group by instructing, via the third interface, the first processor to move the data to the logical volume designated as the migration destination from the logical volume that belongs to the designated group.

7. A management computer connected to a storage system in which data is written by a host computer, comprising:

an interface connected to the storage system;
a processor connected to the interface; and
a memory connected to the processor,
wherein the storage system has a disk drive where data written by the host computer is stored,
wherein the host computer recognizes a storage area of the disk drive on a logical volume basis, and
wherein the processor:

manages the logical volumes in groups by storing the association relation between the logical volumes and groups in the memory;

obtains, via the interface, from the storage system, a storage capacity of the logical volume and used I/O amount of the logical volume, which indicates a amount of a I/O resource used by the logical volume;

designates a logical volume to which data is to be moved based on the ratio of the obtained used I/O amount of the logical volume to the obtained storage capacity of the logical volume; and instructs, via the interface, the storage system to move data from the data's original logical volume to the logical volume designated as the destination of migration.

8. The management computer according to claim 7, wherein the processor:

calculates, from the obtained used I/O amount of the logical volume, a free I/O amount of the group, which indicates a amount of a I/O resource unused by the group;

calculates, from the obtained storage capacity of the logical volume, a free storage capacity of the group, which indicates a storage capacity unused by the group; and compares a ratio of the calculated free I/O amount of the group to the calculated free storage capacity of the group against the ratio of the obtained used I/O amount of the logical volume to the obtained storage capacity of the logical volume, and thereby designating a logical volume to which data is to be moved.

9. The management computer according to claim 7, wherein the processor:

stores, in the memory, a I/O amount of the group, which indicates a limit in usage of a I/O resource of the group;

calculates, from the obtained storage capacity of the logical volume, a used storage capacity of the group, which indicates a storage capacity used by the group;

compares a ratio of the stored usable I/O amount of the group to the calculated used storage capacity of the group against the ratio of the obtained used I/O amount of the logical volume to the obtained storage capacity of the logical volume, and thereby designating a logical volume to which data is to be moved.

10. The management computer according to claim 7, wherein the management computer has a display unit on which information is displayed, and
wherein the processor:

sets a priority level, which indicates the degree of suitableness as a logical volume to which data is to be moved, to a logical volume based on the ratio of the obtained used I/O amount of the logical volume to the obtained storage capacity of the logical volume; and causes the display unit displaying identifiers of the logical volumes in descending order of priority so that a logical volume set to the highest priority level is displayed at the top.

11. The management computer according to claim 7, wherein the processor:

stores, in the memory, relocation execution judgment information, which indicates when to perform processing of moving data between logical volumes; and instructs, at timing that is determined by the relocation execution judgment information stored in the memory, via the interface, the storage system to move data from the data's original logical volume to the logical volume designated as the destination of migration.

12. The management computer according to claim 7, wherein, in the case where a relocation-request to move data to a designated group is received but the designated group does not have a logical volume to which the data can be moved, the processor:

designates a logical volume as a migration destination of data in a logical volume that belongs to the designated group based on the ratio of the obtained used I/O amount of the logical volume to the obtained storage capacity of the logical volume; and secures a storage area for the designated group by instructing, via the interface, the storage system to move the data to the logical volume designated as the migration destination from the logical volume that belongs to the designated group.

13. A data migration method for a computer system having a storage system, which has a disk drive to store data, a host computer, which stores data in the disk drive, and a management computer, which manages the storage system, wherein the host computer recognizes a storage area of the disk drive on a logical volume basis, wherein the storage system measures, for each logical volume, a used I/O amount of the logical volume and a storage capacity of the logical volume, the used I/O amount of the logical volume, which indicates a amount of a I/O resource used by the logical volume, and wherein the management computer:

manages the logical volumes in groups by storing the association relation between the logical volumes and groups;

obtains, from the storage system, the used I/O amount of the logical volume and the storage capacity of the logical volume, which are measured by the storage system;

designates a logical volume to which data is to be moved based on the ratio of the obtained used I/O amount of the logical volume to the obtained storage capacity of the logical volume; and instructs the storage system to move data from the data's original logical volume to the logical volume designated as the destination of migration.

14. The data migration method according to claim 13, wherein the management computer:

calculates, from the obtained used I/O amount of the logical volume, a free I/O amount of the group, which indicates a amount of a I/O resource unused by the group;

calculates, from the obtained storage capacity of the logical volume, a free storage capacity of the group, which indicates a storage capacity unused by the group; and compares the ratio of the calculated free I/O amount of the group to the calculated free storage capacity of the group against the ratio of the obtained used I/O amount of the group to the obtained storage capacity of the logical volume, and thereby designating a logical volume to which data is to be moved.

15. The data migration method according to claim 13, wherein the management computer:

calculates, from the obtained storage capacity of the logical volume, a used storage capacity of the group, which indicates a storage capacity used by the group;

compares the ratio of the stored usable I/O amount of the group to the calculated used storage capacity of the group with the ratio of the obtained used I/O amount of the logical volume to the obtained storage capacity of the logical volume, and thereby designating a logical volume to which data is to be moved.

16. The data migration according to claim 13, wherein the management computer:

sets a priority level, which indicates the degree of suitableness as a logical volume to which data is to be moved, to a logical volume based on the ratio of the obtained used I/O amount of the logical volume to the obtained storage capacity of the logical volume; and causes the displaying unit display identifiers of the logical volumes in descending order of priority so that a logical volume set to the highest priority level is displayed at the top.

17. The data migration according to claim 13, wherein the third processor:

stores, in the third memory, relocation execution judgment information, which indicates when to perform processing of moving data between logical volumes; and instructs, at timing that is determined by the relocation execution judgment information stored in the third memory, via the third interface, the storage system to move data from the data's original logical volume to the logical volume designated as the destination of migration.

18. The data migration according to claim 13, wherein, in the case where a request to move data to a designated group is received but the designated group does not have a logical volume to which the data can be moved, the third processor:

designates a logical volume as a migration destination of data in a logical volume that belongs to the designated group based on a ratio of the obtained used I/O amount of the logical volume to the obtained storage capacity of the logical volume; and secures a storage area for the designated group by instructing, via the third interface, the storage system to move the data to the logical volume designated as the migration destination from the logical volume that belongs to the designated group.

* * * * *